(12) United States Patent
Wood

(10) Patent No.: US 9,821,291 B2
(45) Date of Patent: Nov. 21, 2017

(54) MATERIAL SUCH AS FILM, FIBER, WOVEN AND NONWOVEN FABRIC WITH ADSORBANCY

(75) Inventor: Willard E. Wood, Arden Hills, MN (US)

(73) Assignee: CELLRESIN TECHNOLOGIES, LLC, Bloomington, MN (US)

( * ) Notice: Subject to any disclaimer, the term of this patent is extended or adjusted under 35 U.S.C. 154(b) by 684 days.

(21) Appl. No.: 14/128,324

(22) PCT Filed: Jul. 27, 2011

(86) PCT No.: PCT/US2011/045485
§ 371 (c)(1),
(2), (4) Date: Apr. 23, 2014

(87) PCT Pub. No.: WO2012/177269
PCT Pub. Date: Dec. 27, 2012

(65) Prior Publication Data
US 2014/0334998 A1 Nov. 13, 2014

(30) Foreign Application Priority Data

Jun. 23, 2011 (CA) ..................................... 2744780

(51) Int. Cl.
*B01J 20/26* (2006.01)
*B01D 53/02* (2006.01)
(Continued)

(52) U.S. Cl.
CPC ............ *B01J 20/262* (2013.01); *B01D 53/02* (2013.01); *B01D 53/04* (2013.01); *B01D 53/48* (2013.01);
(Continued)

(58) Field of Classification Search
CPC .. B01J 20/262; B01J 20/3248; B01J 20/3236; B01J 20/3212; B01J 20/321;
(Continued)

(56) References Cited

U.S. PATENT DOCUMENTS

| 2,208,029 A | * | 7/1940 | Heckman ................ C10K 1/20 252/191 |
| 3,274,905 A | | 9/1966 | Demsey, Jr. et al. |

(Continued)

FOREIGN PATENT DOCUMENTS

| CA | 2744780 | 9/2011 |
| GB | 1449285 | 9/1976 |

(Continued)

OTHER PUBLICATIONS

Chen, Qingjun et al., "Poly(ethyleneimine)-Loaded Silica Monolith with a Hierarchical Pore Structure for H2S Adsorptive Removal," Ind. Eng. Chem. Res. 2010, 49, (pp. 11408-11414). Oct. 20, 2010.

(Continued)

*Primary Examiner* — Haytham Soliman
(74) *Attorney, Agent, or Firm* — Kagan Binder, PLLC

(57) ABSTRACT

Compositions that can be used to adsorb low concentration, of unwanted or target substances from a dynamic fluid stream or from an enclosed static vapor phase. Such adsorbency can be obtained with thermoplastic materials used in the form of bulk polymer or a film, fiber, web, woven fabric, non-woven fabric, sheet, packaging and other such structures including or surrounding the enclosed volume. The concentration should be reduced to non-offensive sensed limits or a limit that does not produce a biological response.

22 Claims, 2 Drawing Sheets

(51) Int. Cl.

| | | |
|---|---|---|
| *B01D 53/48* | (2006.01) | |
| *B01J 20/10* | (2006.01) | |
| *B01J 20/28* | (2006.01) | |
| *B01J 20/32* | (2006.01) | |
| *B01D 53/04* | (2006.01) | |
| *B01D 53/52* | (2006.01) | |

(52) U.S. Cl.
CPC ....... *B01J 20/103* (2013.01); *B01J 20/28011* (2013.01); *B01J 20/28023* (2013.01); *B01J 20/28057* (2013.01); *B01J 20/321* (2013.01); *B01J 20/3204* (2013.01); *B01J 20/3212* (2013.01); *B01J 20/3236* (2013.01); *B01J 20/3248* (2013.01); *B01D 53/52* (2013.01); *B01D 2253/106* (2013.01); *B01D 2253/112* (2013.01); *B01D 2253/202* (2013.01); *B01D 2253/25* (2013.01); *B01D 2253/306* (2013.01); *B01D 2255/20738* (2013.01); *B01D 2257/304* (2013.01); *B01D 2257/306* (2013.01); *B01D 2257/706* (2013.01); *B01D 2257/90* (2013.01); *B01D 2259/4541* (2013.01); *Y10T 428/1362* (2015.01); *Y10T 442/2508* (2015.04)

(58) Field of Classification Search
CPC .............. B01J 20/3204; B01J 20/28057; B01J 20/28023; B01J 20/28011; B01J 20/103; B01D 53/04; B01D 53/02; B01D 53/48; B01D 2257/706; B01D 2257/306; B01D 2257/304; B01D 2255/20738; B01D 2253/306; B01D 2257/90; B01D 2253/202; B01D 2253/112; B01D 2253/106; B01D 53/52; B01D 2259/4541; B01D 2253/25; Y10T 442/2508; Y10T 428/1362
USPC ...................................................... 502/402
See application file for complete search history.

(56) References Cited

U.S. PATENT DOCUMENTS

| | | | |
|---|---|---|---|
| 3,365,750 A | 1/1968 | Donald | |
| 3,400,190 A | 9/1968 | Donald | |
| 3,440,686 A | 4/1969 | Corbett | |
| 3,476,627 A | 11/1969 | Squires | |
| 3,477,099 A | 11/1969 | Lee et al. | |
| 3,479,425 A | 11/1969 | Lefevre et al. | |
| 3,524,795 A | 8/1970 | Peterson | |
| 3,557,265 A | 1/1971 | Chisholm et al. | |
| 3,583,032 A | 6/1971 | Stafford | |
| 4,022,223 A | 5/1977 | Rainer et al. | |
| 4,720,039 A | 1/1988 | Nishiguchi | |
| 5,137,687 A * | 8/1992 | Dunson, Jr. ............ | B01D 53/02 210/916 |
| 5,350,788 A | 9/1994 | Visioli | |
| 5,362,784 A | 11/1994 | Brodie, III et al. | |
| 5,413,827 A | 5/1995 | Brodie et al. | |
| 5,576,145 A | 11/1996 | Keil et al. | |
| 5,698,370 A | 12/1997 | Keil et al. | |
| 5,773,518 A | 6/1998 | Keil et al. | |
| 5,829,669 A | 11/1998 | Drummond et al. | |
| 6,244,500 B1 | 6/2001 | Cahill et al. | |
| 7,141,518 B2 | 11/2006 | Macdonald et al. | |
| 7,754,197 B2 | 7/2010 | Wu et al. | |
| 2005/0084474 A1* | 4/2005 | Wu ........................ | A61L 9/014 424/76.1 |
| 2005/0085144 A1 | 4/2005 | Macdonald et al. | |
| 2006/0118058 A1 | 6/2006 | Moore | |
| 2007/0059815 A1 | 3/2007 | Coates | |
| 2011/0059845 A1 | 3/2011 | Fryxell et al. | |
| 2011/0072967 A1* | 3/2011 | Wood .................. | C08B 37/0012 95/141 |

FOREIGN PATENT DOCUMENTS

| | | | |
|---|---|---|---|
| WO | 03018193 | 3/2003 | |
| WO | WO 2009037947 A2 * | 3/2009 | ........... A61K 8/0208 |
| WO | 2012177269 | 12/2012 | |

OTHER PUBLICATIONS

"International Preliminary Report on Patentability," for PCT Application No. PCT/US2011/045485 dated Jan. 9, 2014 (9 pages).
"International Search Report and Written Opinion," for PCT Application No. PCT/US2011/045485, dated Feb. 28, 2012 (12 pages).
"Non Final Office Action," for Canadian Patent Application No. 2,744,780 dated Nov. 2, 2011 (5 pages) with English Translation.
"Non Final Office Action," for Canadian Patent Application No. 2744780, dated Feb. 27, 2012 (3 pages).
O'neil, Maryadele J. "Ferric Hydroxide," The Merck Index: An Encyclopedia of Chemicals, Drugs, and Biologicals, vol. 14, Nov. 3, 2006, p. 688.
"Response to Non Final Office Action," for Canadian Patent Application No. 2,744,780, dated Jan. 16, 2012 (34 pages).
"Response to Non Final Office Action," for Canadian Patent Application No. 2,744,780, dated May 25, 2012 (28 pages).
Sharma, Virender K. et al., "Ferrate(VI) Oxidation of Hydrogen Sulfide," Environmental Science & Technology, vol. 31, No. 9, 1997 (pp. 2486-2491). May 15, 1997.
Sharma, Virender K. et al., "Ferrates (iron(VI) and iron (V)): Environmentally Friendly Oxidants and Disinfectants," Journal of Water and Health, 03.1, 2005 (pp. 47-58). 2005.
Sigma-Aldrich, "Poly(ethyleneimine) solution", available via: http://www.sigmaaldrich.com/catalog/product/aldrich/ 181978?lang=en&region=US, retrieved on Jun. 16, 2017.

* cited by examiner

MATERIAL SUCH AS FILM, FIBER, WOVEN AND NONWOVEN FABRIC WITH ADSORBANCY

This application is being filed as a PCT International Patent application on Jul. 27, 2011, in the name of CELL-RESIN TECHNOLOGIES, LLC, a U.S. national corporation, applicant for the designation of all countries except the U.S., and Willard E. Wood, a U.S. Citizen, applicant for the designation of the U.S. only, and claims priority to Canadian Patent Application Serial Number 2744780, filed Jun. 23, 2011; the contents of which are herein incorporated by reference.

Compositions can be used in an article or structure, including fiber, film and fabric that can adsorb or remove low concentration of an unwanted or target substance from gas or vapor under static and dynamic conditions. A fundamental problem exists in adsorbing low concentrations of a variety of unwanted or target substances from a gaseous volume or vapor phase in a static or a dynamic condition. A static condition is characterized by minimal or no flow of gas or vapor. Dynamic condition is characterized by a flow of at least 1 liters·min$^{-1}$ (16.6 cm$^3$·sec$^{-1}$) through a layer or aperture. At minimal parts per million concentrations, adsorbing significant quantities of a variety of unwanted or target substances become a significant problem. Adsorption occurs when a solid surface is exposed to and accepts or bonds to one or more unwanted or target substance (undesired molecules) in a fluid (gas or liquid droplets) in an area of the interface between the fluid and the solid. Low partial pressure of an unwanted or target substance reduces the tendency to absorb. The term adsorption deals with the process in which the unwanted or target substance (undesired molecules) accumulate in an interfacial layer between a fluid and a surface. The adsorption (a surface process) process is accompanied by absorption, i.e. the penetration of the gas or liquid into the solid phase. The total uptake and removal (adsorption and absorption) of gas or liquid by a solid material is sorption.

At low concentrations in the enclosed volume or enclosed ambient vapor phase, there is very little physical cause, on an energetic basis, for the undesired molecules to be adsorbed.

Adsorption theory is based mainly on the Langmuir (concept of monolayer adsorption, formed on energetically homogeneous solid surfaces) and BET (multilayer isotherm equation proposed by Brunauer, Emmett and Teller) equations, capillary condensation theory, Polanyi potential theory (adsorption potential and the characteristic adsorption curve, which are independent on the of adsorption temperature) and the DR equation (adsorption based on considerations of adsorption energies) related to the latter. The Langmuir and BET equations have distinct deviations from experimental values particularly in the range of low and high relative pressures.

A problem arises in the divergence between theory and experimental. This suggests the existence of additional physical factor that influences adsorption processes; an effect resulting from interactions in the interface area. The disparity is related to the energetic heterogeneity of most real solid (polycrystalline and amorphous) adsorbent. Without wishing to be bound by any theory, it is believed that it has been experimentally shown that the concept of surface heterogeneity (besides defects on the solid surface) can be disturbances in the structure. The presence of structural flaws can affect significantly the surface properties of adsorbents. When target substances are in the very low pressure range, adsorption takes place on the most active sites on the surface or within very narrow pores. Adsorbency by a synthetic polymer material such as polyolefin, polyester, polystyrene and other such materials in the functional form of fiber, film or fabric is one example of this substantial problem.

We have also found, as the boiling point or partial pressure of the undesired molecules or substances decreases, adsorption of the gaseous substance at a constant concentration become increasingly more difficult because there is no energetic reason to promote adsorption and the gaseous substances substantially remain in the vapor phase of the mobile fluid or the enclosed volume. Low partial pressure does not cause adsorption. The molecular interactions between the gaseous substance and interfacial layer are dependent on the particular surface composition and/or the pore structure. As a molecule in a vapor phase approaches a solid surface, a balance is established between the intermolecular attractive and repulsive forces. Further, many adsorbing materials, as bulk material or in a coating, can have a small residual charge present on the surface or displays a separation of charges, i.e., a dipole, effect. Any such extant charge or dipole can inhibit the target substance approach to a surface and prevent substantial adsorption on the surface. For example, in many containers a low, but objectionable, concentration of an unwanted or target substance can accumulate and be maintained in the container contents. A substantial need arises to overcome these energetic and surface effects and improve adsorbency of malodors.

The compositions that can adsorb in static condition and obtain surprising adsorption in dynamic conditions include a source of a ferric (Fe(III) iron) compound and a polyethylenimine (PEI). The PEI can be free of substituent groups on the nitrogen or carbon atoms of the molecule. The adsorbent composition can comprise a Fe(III) compound and a PEI compound or a Fe(III) compound and a PEI compound in at least a monolayer coating. This composition can successfully overcome the natural tendency of such materials to prevent or avoid adsorption. The adsorbent materials can remove, preferably, for example at concentrations less than 15 ppm, of unwanted or target substances from a static or dynamic gaseous or vapor phase.

Improved adsorbency in both dynamic and static mode is derived from an adsorbent comprising a combination of materials that can adsorb unwanted or target substances at low concentration. A removal compound or structure (an adsorber) with reduced charge effects and high surface area can obtain functional adsorbency for low substance concentrations. The structural material can contain the adsorbent composition as a component or the adsorbency can be obtained from a coating on a substrate. The substrate can be made of a natural or synthetic material made with thermoplastic materials that can be used in the form of bulk polymer in a film, fiber, web, woven fabric, non-woven fabric, rigid sheet, cellulosic packaging and other such structures including or surrounding the enclosed volume.

A first aspect comprises an adsorbent, adsorbant layer or coating comprising a Fe(III) compound and a PEI compound.

A second aspect comprises a polymer comprising a major portion of a polymer mass and an effective amount of a adsorbent, adsorbant layer or coating comprising a Fe(III) compound and a PEI compound.

In a third aspect structure can comprise a film or fiber and a coating of an adsorbent comprising a Fe(III) compound dispersed in a adherent promoting PEI compound.

In a fourth aspect, this adsorbent layer or coating can be made from a solution or suspension of a major proportion of a solvent or liquid medium and an adsorbent comprising Fe(III) compound and a PEI compound. The solution or suspension can comprise a liquid aqueous medium and can also comprise a mixed liquid aqueous/non-aqueous medium.

Lastly, in a fifth, a non-woven article or a shaped object or other common polymer form of product can have an effective amount of an adsorbent, adsorbent layer or coating comprising a Fe(III) compound and a PEI compound. These include a container, a woven or non-woven fabric article, a sachet or other product format.

The adsorbency can be used in a woven or non-woven or a container structure to reduce the concentration of unwanted or target substances. The adsorbent compositions can be a compound of the structure or can be at least a monolayer coating. The adsorbent of the invention is typically used in the context of a dynamic or moving fluid or in a static enclosed volume, also known as an enclosed ambient vapor phase that contains the adsorbent of the invention and the unwanted or target substances at a concentration that is not desirable. The concentration should be reduced to below detectable or human sensed limits. Often the lowest possible concentration is desired. Since the contact time in dynamic mode is shorter, obtaining adsorption in dynamic conditions is made more difficult than experienced in static conditions.

The thermoplastic material contains an active adsorbing composition, or a coating thereof, having a certain defined minimum surface area. Minimum coated thermoplastic surface area is 0.1 $m^2 \cdot gram^{-1}$ that uses about a 2 to 50 µm fiber diameter fiber. The minimum surface area associated with the $Fe(OH)_3$ is about 0.5 $m^2$. See FIG. 2 for the relationship between fiber surface area and fiber diameter. A brief inspection of FIG. 2 shows that as the fiber diameter of the nonwoven is reduced to less than 4µ and in particular less than 2µ, the surface area of the nonwoven increases rapidly. As the surface area increases, the fiber coating process and coating solution solids change to achieve uniform surface coating. Accordingly while fibers in the range of 2 to 20µ can be effectively coated and while fibers of the smaller diameter can also be coated the fibers in the range of 1 to 50µ, 2 to 20µ are most readily coated and used in manufacture.

The material can have the adsorbent blended or dispersed into the bulk polymer extending to the surface or in a surface coating of one or more coated layers. The surface of the polymer must expose a minimum amount of the Fe(III) and PEI compound to effectively adsorb.

Depending on context, virtually any, gas or vapor phase, chemical species or mixtures thereof can be an "unwanted or target substance" existing in a dynamic flow or in an enclosed volume or enclosed ambient vapor phase. Such substances can be present at a concentration of at least 5 ppb; about 15 to 0.01 ppm; 5 to 0.01 ppm; 1 to 0.01 ppm or less than 0.5 to 0.01 ppm (concentration based on the total volume) and can be the subject of the adsorption characteristics of the invention to reduce the concentration to a undetectable limit, a limit that is not offensive to humans or to a limit that does not produce a biological response. As the concentration of these materials in the vapor is reduced, and as the dynamic contact time is reduced to less than 1 second, the difficulty of absorbance increases.

The term "dynamic stream" is a fluid (gaseous or vapor) stream flowing a flow rate of at least 1 liters·$min^{-1}$ (16.6 $cm^3 \cdot sec^{-1}$) through a layer or aperture. "Gas" implies a uniform phase or blend of gaseous components. "Vapor" implies a dispersion of small particulate (often liquid droplets, solid particles, and combinations of these) materials in a gas phase.

The term "enclosed volume or enclosed ambient vapor phase" means a static atmosphere containing a target substance is held in a volume with little or no flow.

The unwanted or target substances can exist in the enclosed volume or enclosed ambient vapor phase as a gas, vapor or dispersion of a liquid droplet or solid. These substances often are malodors, irritants, or offensive or inoffensive odor compounds.

"Dynamic removal" an adsorption followed by absorption include a reduction in concentration of unwanted substance by at least a flow of at least 1 liters·$min^{-1}$ (16.6 $cm^3 \cdot sec^{-1}$) through a layer or aperture at a contact time of less than 1 second.

A thermoplastic composition comprising a thermoplastic polymer material with an active adsorbent composite can maintain a substantially neutral balance of negative charge and positive charge material and can enhance the adsorption of compositions onto or into the adsorbent material. The combination of Fe(III) species and PEI in these surfaces obtains excellent adsorbency. The compositions can also contain materials that can enhance or increase the surface area of the surface of the thermoplastic articles. An increased surface area and favorable pore size can increase the adsorption of compounds into the adsorbing materials. The thermoplastic material of the invention can be used in a variety of end uses including webbing layers or structures, protective barrier fabrics or articles, filtration units, face masks, storage bags, garbage bags, deodorizing materials and other such applications. One particularly useful application is a face mask having one or more layers that can remove malodors from breath. Such malodors arise from $H_2S$ and organo sulfur compounds.

The term "fiber" is used in its conventional meaning. The term "fabric" typically means both woven and nonwoven webs including materials of various thicknesses, lengths, widths and compositions. Products include fabrics made typically from the thermoplastic fibers of the invention but can also be made of other fabrics such as cellulosics, linens, and others. The applications for the materials of the invention can be used in face masks, tissue, wipes, towels, clothing, furniture, automotive and other transportation, filtration for industrial or consumer applications. The fibers used in yarn or other nonwovens as described in the invention typically means fibers having relatively small fiber diameters. Such a diameter is generally ranging from about less than 1 micron to as much as 100 microns. Often such fibers have a diameter from about 1 to about 50 microns. Once assembled, a final product can include one or more of the structures disclosed above. The fiber can be combined in a thermoplastic layer, two or more thermoplastic layers can be combined, and a woven fabric can be combined with a nonwoven fabric which can also be laminated onto a film or other such structure. There are a variety of combinations or combinations of the structures of the invention that can be made without departing from the spirit and scope of the invention.

The term "container" in the context of the invention is used in its conventional meaning. The container can comprise a structure surrounding a void or volume and the container can contain the adsorbent materials or a coating thereof. The container, for example, can surround a volume containing a small piece of adsorbent material held within the container. Such containers can include virtually any article that can enclose the vapor phase or atmosphere of the invention. The containers can be made from virtually any materials including cellulosics, plastics, thermosets, metals and other conventional packaging materials. The containers can obtain virtually any geometric shape or dimension. The internal volume of the container can range from as small as 10 millimeters to more than 100 liters, but typically ranges from about 100 millimeters to 4 liters in size. The configuration of the container can be virtually any configuration, including containers made from flexible plastic, rigid and semi-rigid sheet, blow molded plastic bottles, folded and glued paperboard materials, plastic and cellulosic envelopes and other container configurations.

Figure 1:
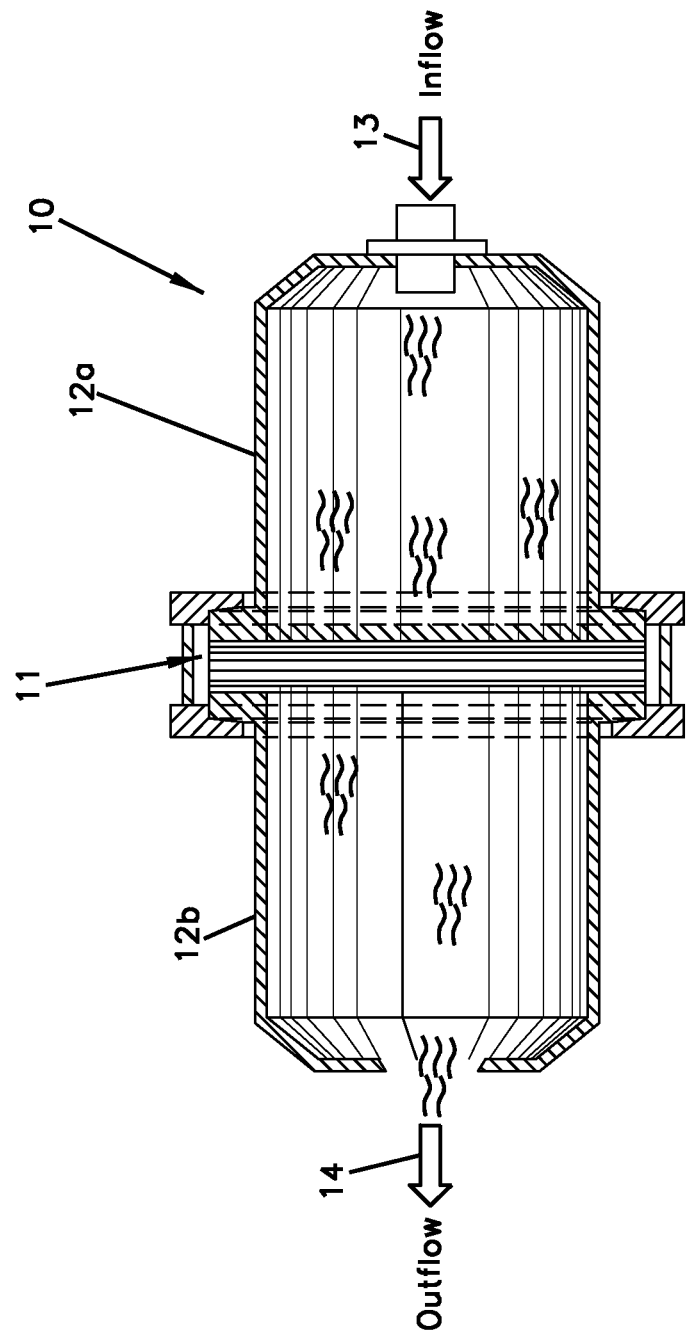
FIG. 1 is a cross section of a test cell.
Figure 2:
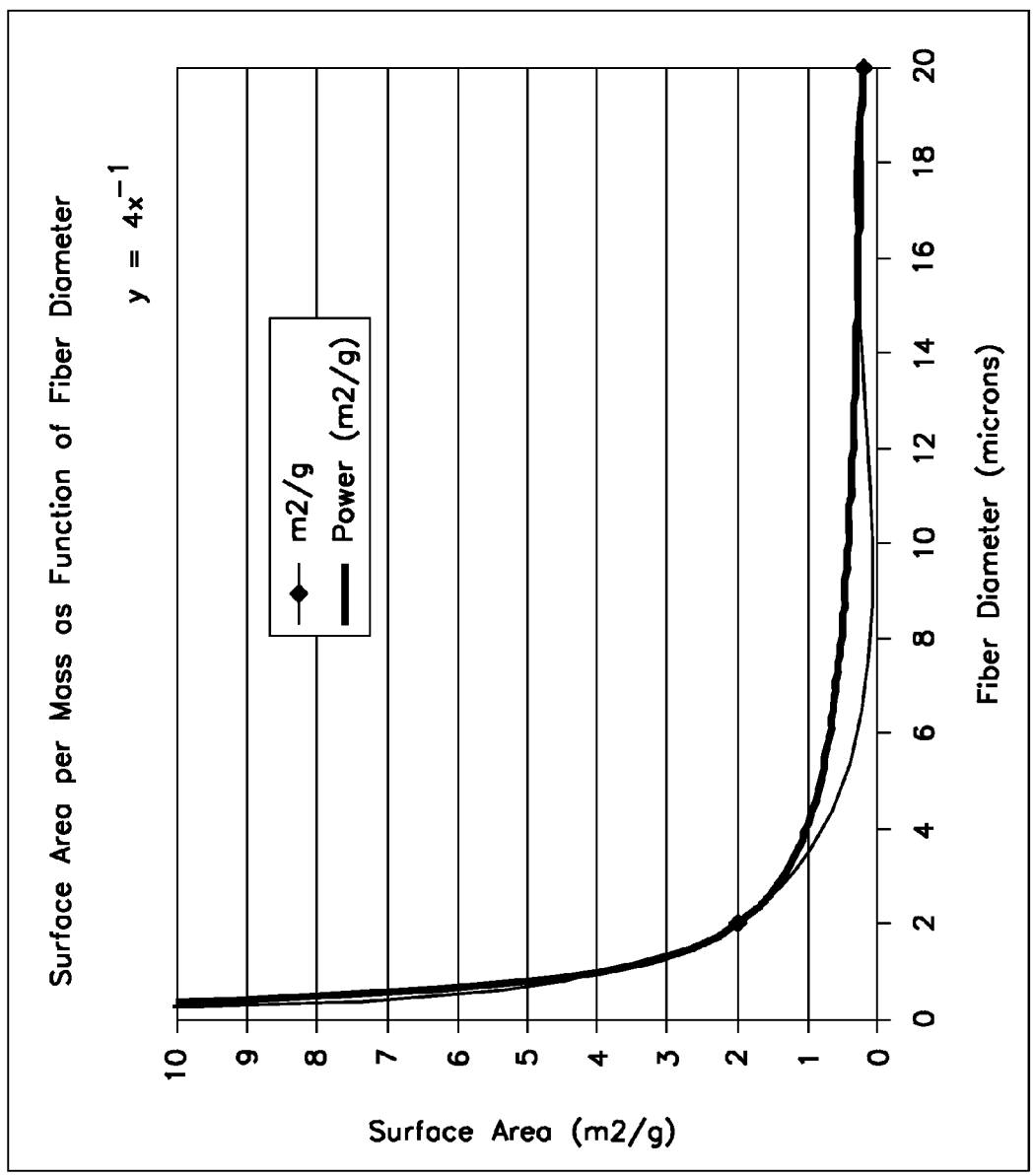
FIG. 2 is a graph representing the change is surface area of fiber as fiber diameter changes.

The adsorptive composition comprises a source of ferric iron including Fe(III)), a ferrate salt or Fe(OH)$_3$ combined with a polyalkylenimine (PEI) on a surface. A polymer composition can be modified by including an effective amount of adsorbent onto the polymer mass.

Adsorbent Compositions Solids Content on the Composition

| Components | First Adsorbent Embodiment (Wt. %) | Second Adsorbent Embodiment (Wt. %) | Third Adsorbent Embodiment (Wt. %) |
|---|---|---|---|
| Polyethylenimine | 1.0-80 | 15-65 | 20-60 |
| Fe(III) Compounds | 1.0-85 | 15-70 | 20-65 |
| Optional Silica | — | — | 1-30 |
| Optional CD | — | 1-10 | — |

Polymer Compositions on the Total Polymer Composition

| Components | First Polymer Embodiment (Wt. %) | Second Polymer Embodiment (Wt. %) | Third Polymer Embodiment (Wt. %) |
|---|---|---|---|
| Polymer | 75-98 | 80-95 | 85-95 |
| Polyethylenimine | 0.1-35 | 0.5-30 | 1-20 |
| Fe(III) Compounds | 0.1-35 | 0.2-30 | 1-20 |
| Optional Silica/CD | | 0.1-10 | 0.5-5 |

Coating on Polymer Compositions on the Coated Material

| Components | First Embodiment (Wt. %) | Second Embodiment (Wt. %) | Third Embodiment (Wt. %) |
|---|---|---|---|
| polymer | 75-98 | 80-95 | 85-95 |
| Polyethylenimine | 0.1-10 | 1-9 | 2-8 |
| Fe(III) Compounds | 0.1-15 | 0.2-10 | 0.3-9 |
| Optional Silicate | | 0.1-10 | 0.5-5 |
| Optional CD | | 0.1-10 | 0.5-5 |

The adsorptive compositions can be in the form of a layer or coating and can also contain a silica, a CD (cyclodextrin), a substituted cyclodextrin (substituted CD) or a polymer with pendent CD moiety. These materials with the adsorbent and optional components can be coated and laminated into a variety of useful films, sheets, fibers, nonwoven webs, monolithic structures, or other shapes using conventional processing technology. These useful forms can be incorporated into a container configuration.

Virtually any chemical species that can form a gas or vapor can be an unwanted or target substances. The unwanted or target substances can exist in a mobile fluid, gaseous stream or liquid or in an enclosed volume or enclosed ambient vapor phase as a gas, vapor or dispersion of a liquid or solid. These substances often are malodors, irritants, or offensive or inoffensive odor compounds. Such compound chemical families include hydrocarbons $C_{3+}$ alcohols or acids, sulfur compositions, amines, and can include alkanes, alkenes, alkynes, alkane thiols, alkyl sulfides, alcohols, aldehydes, amines, carboxylic acids, ethers, and ketones. Non-limiting example compounds include $H_2S$, methanethiol, ethanethiol, 1-propanethiol, 2-propanethiol, 2-butanethiol, carbonyl sulfide, methyl allyl sulfide, methyl sulfide, dimethyl disulfide, dimethyl trisulfide, ethyl sulfide, methyl propyl sulfide, allyl mercaptan, formic acid, formaldehyde, acetaldehyde, acrolein, diacetyl, dimethyl ether, diethyl ether, methylamine, dimethylamine trimethylamine, ethylmethylamine, butylamine, cyclopropylamine, methane, ethane, propane, butane, ethylene, acetylene, propylene, 1-butene, 2-butene, allene, isobutene, 1,3-butadiene, 1-butyne, 2-methylpropene, 2-methyl-2-butene, cyclopropane, cyclobutane, methylcyclopropane and others. Many of these malodors are present in breath associated with halitosis.

Such substances can be present at a concentration of at least 5 ppb or about 15 to 0.010 ppm (10 ppb) and can be the subject of the adsorption characteristics of the invention to reduce the concentration that cannot be sensed by humans or to a limit that does not produce a biological response. An offensive limit refers to the limit which is objectionable or unpleasant to an individual to sense the unwanted or target substances. A limit that can produce a biological response refers to the amount that a pheromone or gaseous hormones such as ethylene can produce its desired result in a biological organism.

Polyethylenimine, used as an adsorbent, is a polyamine made by polymerizing the cyclic monomer ethylene imine. The typical polymer can contain primary terminal (—NH$_2$) groups, secondary (—NH—) amine groups within the polymer and in a chain branch and tertiary amine groups at a branch point. Linear polyethylenimines (PEIs) contain primarily secondary amines with terminal primary amine groups. Branched PEIs contain primary, secondary and tertiary amino groups. The linear PEIs are solids at room temperature where branched PEIs are liquids at all molecular weights. Linear polyethylenimines soluble in hot or cold water, at low pH, in methanol, ethanol, or chloroform and is insoluble in benzene, ethyl ether, and acetone. Polyethylenimine (CAS REGISTRY NUMBER 09002-98-6) is represented by the following general formula:

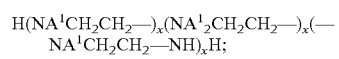

wherein each A1 is independently hydrogen, an alkoxy group or a linear or branched polyethylenimine group and wherein each x is independently from 5 to 20,000.

Polyethylenimine has an average molecular weight from about 500 to about 1,000,000; preferably from about 2,000 to about 800,000; more preferably from about 10,000 to about 750,000; and most preferably from about 50,000 to about 750,000. Non-limiting examples of additional materials include: epichlorohydrin modified PEI, ethoxylated polyethyleneimine, polypropylenimine diamine dendrimers, poly(1,2-dihydro-2,2,4-trimethylquinoline), and poly(dimethylamine-co-epichlorohydrin-co-ethylenediamine).

The preferred Fe(III) compound useful in the construction comprises a ferrate salt or ferric hydroxide $Fe(OH)_3$ also known as the ferric oxy hydroxide as a result of unique iron stoichiometry. Typically the Fe(III) compound is combined with a polymer and is coated into an adsorbent layer and after coating and final assembly, the Fe(III), is typically converted into ferric hydroxide. A variety of sources of iron III (Fe(III)) compounds can be used to form the active adsorbent materials.

The source of Fe(III) can be any iron-providing material, which can include carbonyl iron, iron salts, chelated iron, encapsulated iron, iron complexes, and mixtures thereof. Illustrative sources of Fe(III) contemplated by this invention include any of the ferric halides such as $FeCl_3$, ferric citrate, ferric nitrilotriacetic acid (Fe(III)-NTA), $Fe(OH)_e$, ferric ammonium citrate, $Fe(NO_3)_2$, $Fe(SO_2)_3$, ferric oxide hydrate, ferric ammonium sulfate, ferric sodium citrate, ferric sodium edetate, ferric acetate, ferric phosphate, ferric pyrophosphate, ferric fumarate, etc. Ferrous salts can be used if oxidized to Fe(III) before or after coating including ferric succinate, ferrous hydroxide, ferrous nitrate, ferrous carbonate, ferric sodium pyrophosphate, ferric tartrate, ferric potassium tartrate, and organo-ferric compounds.

Preferred sources of Fe(III) is selected from the group consisting of ferric hydroxide, alkali metal ferrate, ferric chloride, ferric citrate, ferric nitrate, ferric nitrilotriacetic acid, powered ferric oxyhydroxide, other similar iron salts, and mixtures thereof.

A number of iron compounds in the ferric form, can remove malodors such as volatile sulfur compounds in an active in finely divided form on a substrate. Testing has shown that a source of $Fe(OH)_3$ in combination with PEI provides a degree of dynamic removal not achieved in the past chemistries. Removal directly related to the nature of the surface including particle size, morphology and surface area. The surface of $Fe(OH)_3$ combined with PEI has a better removal character than comparable combinations of $Fe_2O_3$ and PEI.

In industrial applications, iron (III) chloride is used in sewage treatment and drinking water purification. In these applications, $FeCl_3$ in slightly basic water reacts with the hydroxide ion to form a floc of iron (III) hydroxide, or more precisely formulated as FeO(OH) known as ferric oxide hydroxide.

$$Fe^{3+}+4OH^-\rightarrow Fe(OH)_4^-\rightarrow FeO(OH)_2^-\cdot H_2O$$

A number of species are dubbed iron(III) oxide-hydroxide. These chemicals are oxide-hydroxides of iron, and may occur in anhydrous (FeO(OH)) or hydrated (FeO(OH).$nH_2O$) forms. The monohydrate (FeO(OH).$H_2O$) might otherwise be described as iron(III) hydroxide ($Fe(OH)_3$), and is also known as hydrated iron oxide. The active ferric hydroxide is a highly porous (mesosphere with a micropore volume approximately 0.0394+/−0.0056 $cm^3\cdot g^{-1}$, mesopore volume approximately 0.0995+/−0.0096 $cm^3\cdot g^{-1}$) adsorbent with a BET surface area of 235+/−8 $m^2\cdot g^{-1}$.

Iron(III) oxide-hydroxide can be obtained by reacting ferric chloride with sodium hydroxide, potassium hydroxide or sodium bicarbonate in typically aqueous solution:

$$FeCl_3+3NaOH\rightarrow Fe(OH)_3+3NaCl$$

$$FeCl_3+3KOH\rightarrow Fe(OH)_3+3KCl$$

$$FeCl_3+3NaHCO_3\rightarrow 3NaCl+Fe(OH)_3+3CO_2$$

Some amount of $Na^+$, $K^+$, or Na Cl salt remains in the coating as a result of these synthesis charateristics.

Alternatively, redox reactions of potassium ferrate ($K_2FeO_4$) produce rust-like iron oxides which are environmentally innocuous and have been described as a 'green oxidant'. $K_2FeO_4$ is reactive as indicated by the fact that it decomposes in contact with water evolving oxygen and forming ferric hydroxide:

$$4K_2FeO_4+10H_2O\rightarrow 3O_2+4Fe(OH)_3+8KOH$$

Optionally, the construction can contain a CD compound or one or more of three forms of amorphous silica-silica gel, precipitated silica and fumed silica.

The particle size of the preferred materials range from about 0.001 to $10^3$ or 0.050 to 700 microns and the preferred materials have a surface area that ranges from about 60 to 750 $m^2\cdot gm^{-1}$ or 200 to 1,000 $m^2\cdot gm^{-1}$. The compositions of the invention are often prepared by dispersing the Fe(III) compound and polyethylenimine materials into a polymer or into a coating liquid. In one embodiment, the adsorber can be used with a CD or with a silica materials for the purpose of introducing a relatively high surface to the Fe(III) polyethylenimine material surface.

Silica particles can be used to enhance the surface area of the materials of the invention. In particular, silica gel particles that are preferred for use in the invention are relatively small particle size materials having large surface areas per gram. Synthetic amorphous silica (CAS #7631-86-9), a form of silicon dioxide ($SiO_2$) is manufactured, thus differentiating it from naturally occurring amorphous silica, e.g. diatomaceous earth. As a manmade product, it is greater than 95% pure amorphous silica whereas naturally occurring amorphous silica also contains crystalline forms of silica. Amorphous silica can be further divided into two forms that are characterized by their distinct manufacturing processes—wet process silica (CAS #112926-00-8) which includes precipitated silica and silica gel, and thermal process silica (CAS #112945-52-5) which includes fumed or pyrogenic silica. Fumed silica is essentially non-porous whereas precipitated silica contains some micropores (>0.3 μm) and silica gel is highly porous and contains macro-, meso-, and micro-pores offering a pore size range from 0.0001 to 1 μm. Pore size is defined as the pore width measured as the diameter of the cylindrical pore or distance between opposite walls of the slit. Fumed silica is commercially manufactured by Degussa Corporation (Areosil) and Cabot Corporation (Cab-O-Sil). Silica gel is manufactured by W.R. Grace (Davisil) and Merck Chemicals.

Cyclodextrin can be used as an unmodified material, as a substituted material or as a CD grafted polymer material. CD is a cyclic oligomer of α-D-glucose formed by the action of certain enzymes such as CD glycotransferase (CGTase). Three CDs (alpha, beta, and gamma) are commercially available consisting of six, seven, and eight α-1,4-linked glucose monomers, respectively. The most stable three-dimensional molecular configuration for these oligosaccharides is a toroid with the smaller and larger opening of the toroid presenting primary and secondary hydroxyl groups.

The specific coupling of the glucose monomers gives the CD a rigid, truncated conical molecular structure with a hollow interior of a specific volume. The CD can be used as a substituted CD or a polymer with pendent CD moiety. CD molecules have available for reaction a primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, substantially dry CD molecules can be reacted to obtain a substituted or grafted CD. A CD with selected substituents, i.e., substituted only on the primary hydroxyl or selectively substituted only at one or both the secondary hydroxyl groups can also be grafted if desired. Directed synthesis of a derivatized molecule with two different substituents or three different substituents is also possible. These substituents can be placed at random or directed to a specific hydroxyl. These substituents may be chosen such that they the site of the grafting reaction. For example, alcohol derivatives (e.g., hydroxyethyl and hydroxypropyl) and amino derivatives of CD can be reacted with a substituent on a polymer backbone to make a grafted CD.

A preferred preparatory scheme for producing a substituted CD material involves reactions at the primary or secondary hydroxyls of the CD molecule. It is meant that a hydroxyl functionality of the CD reacts with a substituent forming reactant. The formation of an ester or ether bond on either the primary or secondary ring hydroxyls of the CD molecule involve well-known reactions. For the purpose of this patent disclosure, the term "degree of substitution (D.S.)" for the CD means the statistical average number of substituents on each glucose moiety of the CD ring.

The invention can also include a polymer with pendent CD moiety. Commercial polymer functionalization can be achieved, for example, using solution, melt and solid state routes known in the art. The process covalently bonds monomers onto polymers generally. Polyolefin polymers can be used including, for example, copolymers of olefins with other monomers, such as vinyl monomers, which predominately constitute the olefin portion. Polyolefins useful in this disclosure include, for example, poly(ethylene) or PE, poly(propylene) or PP, poly(ethylene-co-propylene) or PEP, ethylene/methyl acrylate copolymer, ethylene/ethyl acrylate copolymer, ethylene-α-octene copolymer, ethylene-butene copolymers, and like polymers and copolymers. The polyolefins can be functionally modified with unsaturated compounds such as unsaturated anhydrides and carboxylic acids. Additionally, there can be modified terpolymers of, for example, ethylene-acrylate (ethyl or butyl)-maleic anhydride, ethylene-methyl acrylate-glycidyl methacrylate, and like polymers. In embodiments, any packaging grade of a vinyl polymer can be used. The modified polymers of the invention can be derived in some embodiments from a polymer having a melt index of about 0.7 to 1,800 g·10 min$^{-1}$. In other embodiments, the modified polymers of the invention can be derived from a polymer having a melt index of about 1 to about 1,200 g·10 min$^{-1}$.

Functionalized polyolefins can be used with the coatings of the invention or blended with the CD pendant polymers. Functionalized polyolefins, have extensive industrial applications such as extrusion or coextrusion tie resins in multilayer films and bottles for the food industry, compatibilizers for engineering polymers and plastic fuel tank tie resins for the automotive industry, flexibilization and compatibilization of halogen free polymers for cables, for filler materials used in roofing construction, and like applications. Functionalized polyolefins useful in the present disclosure include, for example, maleated polyethylene and polypropylene (OREVAC and LOTRYL from Atofina Chemicals Inc. of Philadelphia, Pa., PLEXAR and INTEGRATE resins from Equistar Chemicals L.P of Houston, Tex., FUSABOND resins from DuPont Co. of Wilmington, Del., OPTM resins from Manas of Ankara, Turkey, ADMER resins from Mitsui Chemicals of Rye Brook, N.Y., and EXXELOR from Exxon/Mobil Corp. of Irving, Tex.), maleic anhydride functionalized ethylene vinyl acetate copolymers (EVA-MA, such as Orevac EVA-MA from Atofina or Fusabond C series EVA-MA from DuPont); EPDM (such as ethylene-propylene-butadiene or ethylene-propylene-1,4-hexadiene polymers) ethylene/1-butene copolymers, ethylene/1-hexene copolymers, ethylene/1-octene copolymers, ethylene-n butyl acrylate-maleic anhydride copolymers, ethylene-ethylacrylate-maleic anhydride terpolymers, or copolymers of ethylene and glycidyl methacrylate. Other polymers, that are not olefinic, can also be employed in embodiments of the invention. For example, styrene-maleic anhydride (SMA) copolymers are a particularly useful group of reactive copolymers. SMA copolymers are available as, for example, Hiloy SMA copolymers from A. Schulman Inc. of Akron, Ohio, Prevex, SMA from General Electric Co. of Fairfield, Conn. and Dylark SMA from NOVA Chemicals of Calgary, Alberta Moon Township, Pa. Ethylene-propylene-1,4-hexadiene polymer can be represented as: wherein x, y and z can be selected to obtain, for example, about 70 to 90 wt % ethylene, about 10 to 30 wt % propylene and up to about 5 wt % 1,4-hexadiene $R_1$ and $R_2$ may be similar groups, H, or end groups.

The copolymerization of styrene with maleic anhydride to form SMA copolymer provides a material with a higher glass transition temperature than polystyrene and is chemically reactive as it provides maleic anhydride functionality. SMA copolymers are often used in blends or composites where interaction or reaction of the maleic anhydride provides for desirable interfacial effects. SMA is utilized in the automotive industry for the injection molding and thermoforming of interior parts. The superiority of SMA over polystyrene is due to its higher heat deflection temperature, which is required for automotive use. SMA copolymers have also been extensively used as binder polymers due to the reactive maleic anhydride moieties, which can easily be functionalized with a group or groups to provide tailorable surface energy and chemical compatibility. For example, Keil et al., U.S. Pat. Nos. 5,576,145, 5,698,370, and 5,773,518 disclose an SMA based binder polymer in which the maleic anhydride residues are mono-esterified to between about 50 and about 65 mole percent of an alkyl, aryl, cycloalkyl, alkaryl, or arylalkyl alcohol having a molecular weight greater than 100 as a means of providing interlayer adhesion between two incompatible polymers.

Another useful polymer that can be grafted with CD to form a CD grafted polymer of the invention is polypropylene. Commercially, maleic anhydride bonded to polypropylene is available, for example, from Honeywell Performance Products of Heverlee, Belgium or the Sigma Aldrich Company of St. Louis, Mo. However, maleic anhydride is also easily added to polypropylene, e.g. in an extrusion reaction by adding maleic anhydride to a molten extrusion stream of polypropylene. In such reaction schemes, CD can advantageously be added further down in the extrusion path, where it can react with the maleic anhydride groups on the modified polypropylene. The general reaction scheme of incorporating maleic anhydride into polypropylene using a radical source such as hydrogen peroxide is shown below.

Polymer with pendent CD compositions of this disclosure may be prepared using, for example, reactive extrusion by feeding a dry CD, or derivative thereof, (<0.10% moisture), a functionalized polyolefin and optionally a second polyolefin, into an extruder at temperatures such that the CD reacts with the functionalized polyolefin as the molten polymer and CD are transported through the extruder to form a reaction product containing. One class of useful polymers is polyolefins, including polyethylene, polypropylene and related copolymers and terpolymers. In some embodiments, a mixture of a cyclodextrin (CD), a substituted CD or a polymer with pendent CD moiety can be used or blended with an unmodified polyolefin resin. In these embodiments, the unmodified thermoplastic resin can have a melt index of about 0.5 to 1800 g·10 min$^{-1}$, and the modified polymer can be derived from a polymer having a melt index of about 0.7 to 1,500 g·10 min$^{-1}$, or about 1 to 1,200 g·10 min$^{-1}$. Another class of useful polymers is polyesters.

Air flow rate past a layer or through a composite can be in the range of 1 to 50 liters·min$^{-1}$, 5 to 20 liters·min$^{-1}$ (16.6 to 833.3 cm$^3$·sec.$^{-1}$ or 83 to 333 cm$^3$·sec.$^{-1}$) depending on application. In a face mask the volume is an inspiration/expiration volume (the lung volume of men versus that of women) and normal breathing or rapid breathing results in a contact time on the fiber of about 0.1 to less than 0.01 sec. and about 0.05 to 0.01 seconds. Normal static or dynamic H$_2$S scrubbing processes require several minute contact times. Some PEI coatings on silica-monoliths have contact times in the range of 0.1 to 0.2 sec based on linear flow. The adsorbent/adsorbent structures disclosed can be effective with extremely low H$_2$S to Fe(OH)$_3$/PEI/fiber surface contact time. Using a static test instead of a dynamic test, most coatings will provide some removal depending on surface area/geometry and concentration of malodor, Fe(III) and PEI. In a dynamic test, a ferrate compound with a cation and a ferrate anion (FeO$_4$)$^{-2}$ such as sodium Na$_2$(FeO$_4$) or potassium ferrate K$_2$(FeO$_4$) or Fe(OH)$_3$ in combination with PEI obtains enhanced removal. Ferrate compounds are converted into Fe(OH)$_3$ in the mask layers.

A useful construction can contain a substrate with an active concentration of the Fe(III) and PEI in the substrate or the substrate can contain a coating of the Fe(III) and PEI. Such a substrate can be a fiber, film, fabric (woven or non-woven) sheet, rigid or semi rigid layer or other article. The construction can use a single or multilayered assembly having an adsorbent as a compound of the construction or as a removal layer. A removal layer with an active chemistry capable of removing malodorous substances from a dynamic stream passing past or through the construction can improve adsorption.

The removal layer can be made by either blending the adsorbent with the substrate material or by coating a structure or substrate with a solution of the Fe(III) compound and the polyethylenimine. The substrate can be any material in the form of film, fiber, sheet, semi-rigid or rigid sheet, containers, non-woven or woven fabrics, etc. The substrate can be a natural or synthetic polymer.

Examples of useful substrate materials are natural materials or synthetics such as non-woven polyesters; synthetic nonwoven polypropylene and natural woven cotton interlock materials. Substrate materials can be selected from the group consisting of: polyolefins (e.g., polyethylene, polypropylene), polylactic acid, polyesters (PET, CPET & rPET), nylons, acetates, nylon, polyethylene, polyesters, polypropylene, polystyrene, ethylene vinyl acetate copolymers, polyurethanes, poly-α-olefins such as polybutadiene and poly α-octene, and polyamides such as nylon-6 and nylon-6,6, polyureas, polycarbonates, polyethers, polyketones, poly(vinyl chloride), fluoropolymers, and silicone polymers are commonly used polymers in forming useful articles. Similarly, many commercially useful copolymers, terpolymers, and the like can be used. For example, polyesters, PLA polymers and copolymers, acrylonitrile-butadiene-styrene (ABS), poly(ethylene oxide)-co-(propylene oxide), ethylene-vinyl acetate copolymers, poly(ether-ether-ketone) and the like are useful copolymers and terpolymers for various end use applications. Any other polymer and copolymer capable of being formed into film or fibers can be used. Natural fibers comprising cotton or cellulose capable of being formed into a sheet or woven and combinations thereof.

Polyesters are a generally useful class of polymers from which many containers, nonwoven fabrics, and various other articles are made. Uses of polyesters include applications set forth in co-pending U.S. patent application Ser. No. 10/163, 817. One useful polyester material that can be incorporated into a blend with, or topically coated with the invention is polylactic acid, or polylactide (PLA). PLA is a biodegradable, thermoplastic, aliphatic polyester derived from renewable resources and having a general repeat unit of —CH(R)—C(O)—O—. It is most commonly formed from starting materials such as corn starch or sugarcane. Bacterial fermentation is used to produce lactic acid, which is oligomerized and then catalytically dimerized to make a lactide monomer for ring-opening polymerization. It can be easily produced in a high molecular weight form through ring-opening polymerization using most commonly a stannous octoate or tin (II) chloride ring opening catalyst. PLA can be processed like most thermoplastics into fiber (for example using conventional melt spinning processes) and film. NatureWorks LLC, a wholly owned subsidiary of Cargill Corporation, produces PLA under the trade name NatureWorks polymer. Other companies from which PLA can be obtained include Toyota (Japan), Hycail (The Netherlands), and Galactic (Belgium). Because it is biodegradable, PLA can be employed in the preparation of bioplastic for such articles as food packaging, loose fill packaging, and disposable containers. PLA can also be made into fibers.

In addition to the adsorbent, the substrate can include, in various embodiments, a mixture of natural and synthetic fibers; reactive fibers; scavenging fibers (e.g., zeolite, activated charcoal, and like scavengers); biodegradable polymer materials such as polylactic acid; a reduced basis weight; or combinations thereof. The containers of the disclosure may have a range of properties imparted to them, such as breathability; stretchability; shape or body-conforming capability; cloth-like aesthetics and feel; rigidity; high strength; transparency or opacity; a smooth or patterned surface; and the like.

The compositions are directed to reducing the concentration of unwanted or target substances within an enclosed atmosphere or vapor phase. Such an atmosphere or vapor phase is often held within and substantially surrounded by a container. The important characteristic of the container of the invention is that it encloses the atmosphere or vapor phase of the invention and can be made from or combined with the compositions of the invention for the purpose of reducing the concentration of the unwanted or target compositions of the invention from the enclosed atmosphere or vapor phase. In this regard, in the manufacture of the containers of the invention, the compositions of the inventions can be incorporated into the materials from which the containers are made. For example, a PET beverage container can be made from a thermoplastic polyester that contains the Fe(III) and PEI compounds and the other materials of the invention that can reduce the concentration of undesirable or target substances that can form within the vapor phase held within the PET plastic container. Alternatively, such a container can be made by coating the interior of the container with the adsorbent composition.

Alternatively, an insert can be used by placing it into the interior of the container. The insert material can be made from the composition of the invention or coated by the compositions of the invention and as long as the insert can adsorb and is held within the internal structures of the invention, the compositions of the invention can reduce the concentrations of the unwanted or target composition. The insert comprising the compositions of the invention or a material coated with the compositions of the invention can take a variety of embodiments. For example, a flexible food wrapper can be coated with the compositions of the invention. Such a wrapper can be made from thermoplastic materials or from cellulosic or paper derived compositions. Such wrappers can be used as a primary wrapping structure or can comprise an internal envelope containing a food product, for example, as used in an internal envelope for breakfast cereal. The thermoplastic compositions in the invention can be formed into virtually any shape or configuration useful in packaging food and the coating compositions of the invention can be coated on virtually any container surface useful in packaging technologies.

Another embodiment of the invention is a porous nonwoven (spunbond or meltblown) or woven fabric comprising the adsorbent composition. Such a fabric can be used to continuously reduce unwanted or target substances from a dynamic stream or from the closed atmosphere of a package.

The compositions of the invention can be used in the form of sachets. The sachets can contain the compositions of the invention in the form of particulate film or fiber. Alternatively, the sachets can be made of fiber or film made from the compositions of the invention and can be formed to contain the materials of the invention. The sachets of our invention comprise hollow container fabricated from permeable, porous or non-porous materials. The container can take any form including but not limited to an envelope, a sheet, a non-woven or woven format. The containers can be closed using any closure technology including adhesive closure, heat seal technology or sewing. The porous materials are porous to the target adsorbent of the invention. The sachets of our invention are fabricated from permeable or porous materials that can be formed into enclosures. The fabric, non-woven or sachets can be made of natural fibers or from synthetic thermoplastics in the form of woven fabric, non-woven or film. The adsorbent article can also be fabricated from non-porous materials if the walls have discrete openings so that adsorbent may pass there through as they arise.

In certain embodiments, the present disclosure provides a container article comprising a film of the present invention containing the adsorbent or having an adsorbent coating. Such a film preferably has a thickness of 500 μm or less and more preferably 0.5 to 400 μm. In certain thin-film applications and/or handling, the thickness of the film is preferably 5 to 200 μm and more preferably 10 to 100 μm. The film can comprise a thermoplastic polymer composition comprising a blend of a polyolefin resin and a chemically-modified polyolefin resin or a blend of thermoplastic resins (e.g., PE, PP, PET and polylactic acid (PLA)) and can be made using conventional methods. Flexible films are typically melt extruded through a straight or circular die and can have thickness of, for example, from about 4 micrometers (μm) to about 200 μm. The films may be extruded at much greater thickness, and then stretched in one or two directions to a thin, uniform film. Post-extrusion stretching, uniaxial or biaxial, can also provide orientation of the molecular structure that can further enhance strength and barrier properties of the film. Processes for extrusion and laminating thermoplastic materials are described in U.S. Pat. Nos. 3,400,190; 3,440,686; 3,477,099; 3,479,425; 3,476,627; 3,524,795; 3,557,265; 3,583,032; and 3,365,750. Many coextruded structures are made up of polyolefins such as polyethylene and polypropylene. These polyolefins are useful for compositions of the invention. Low density polyethylene (LDPE) and linear low density polyethylene (LLDPE) resins have been used extensively in coextruded structures for their toughness and sealability. High density polyethylene (HDPE) resins are selected for their moisture barrier, stiffness and machineability characteristics. Polypropylene (PP) is chosen for its ability, through orientation, to provide clear machineable films with high impact and stiffness properties. Polyolefins can be combined with other resins to achieve multilayer functionality. Copolymers of ethylene-vinyl acetate (EVA), ethylene-acrylic acid (EAA), and ethylene-meth acrylic acid (EMA) are regularly used as skin layers for their low-temperature sealing characteristics.

Semi-Rigid Films are produced by straight die melt extrusion or calendaring. Multilayer structures can be, for example, a co-extrusion or an adhesive lamination. Typical thermoforming grade films can have thickness of, for example, from about 200 microns to about 1 millimeter. The coextruded sheet structures may be high-barrier packages. Polystyrene, polyester, polypropylene, and polyethylene are the predominant structural materials used in co-extrusions for semi-rigid packaging applications. Known co-extrusion structures for semi-rigid packaging is described in U.S. Pat. Nos. 3,479,425 and 3,557,265. Structural resin selection is dependent on use requirements, co-extrusion processability, and container-forming considerations. Such films can be heat softened and vacuum formed into tubs, pots, blisters, trays and punnets.

Rigid films can be made by, for example, extrusion, co-extrusion, profile extrusion, injection molding, compression molding, reaction injection molding, injection blow molding, or any other thermal processes known in the art. Rigid structures typically have thicknesses greater than 1 millimeter, and may have thickness of up to 2.0 cm or even greater thicknesses. Many of these containers are of a monolayer structure as the large wall thickness provides for an adequate barrier. Where a high barrier is required, multilayer structure techniques can be used. One such rigid structure is a storage unit, such as for storing food, clothing, soiled items, household wastes, and the like. Such structures can be, for example, a diaper pail, a vegetable bin for a refrigerator, a reusable food container, a general storage bin, or a garbage container.

Composite Materials typically multilayer plastic structures can be further extended with the inclusion of one or more plastic or non-plastic materials. Materials that can be combined with plastics to form composites can be, for example, thermoset resin, aluminum, paper, felt, paperboard, nonwovens and like materials. The combination of paper, paperboard, foil, and thermoplastic polymers, can provide, for example, a sealable high-barrier structure. Multilayer packaging structures are described in U.S. Pat. Nos. 3,274,905; 4,720,039; 5,829,669 and 6,244,500. Combining thermoplastics with paperboard can provide hermetic, rigid composite structures, such as round, canister and shaped composite paperboard cans, paperboard pails, fiber cartridges. Common uses of such structures are, for example, powdered beverages and infant formulas, cereal, coffee, snacks, nuts, cookies and crackers, confectionery, spices/seasonings, nutritional supplements, and pet foods. In such applications, the compositions of the invention provide new packaging performance attributes for high barrier packages, particularly when used for foods that are susceptible to undesirable food decomposition flavor and odor within the package.

Multifunctional packaging resins can be combined into one manufacturing step using, for example, co-extrusion technology. Multilayer structures are distinct coextruded layers of different polymers formed by a simultaneous extrusion of the polymers through a single die. Multilayer films produced by lamination or co-extrusion can offer an enhancement of many or all performance properties compared to monolayer films. Typically, a multilayer plastic film can incorporate compositions of the invention into one or more layers, typically a layer exposed to the enclosed atmosphere depending on the desired functionality.

Coextruded multilayer structures can be divided into three categories: single-resin, unbalanced, and balanced. There can be, for example, multilayer films using only one polymer (AAA), unbalanced coextruded films with combinations of two or more polymers (ABC), and balanced multilayer structures with combinations of two or more polymers (A/B/C/B/A). Unbalanced structures typically combine a functional layer with a heat-seal resin. Balanced structures generally have the same heat-sealable resin on both the outside and inside surface of the film.

In certain embodiments, the present disclosure provides a container article comprising a fabric. Such a fabric can be a portion of the structure with the enclosed volume or enclosed ambient vapor phase. The fabric comprising a woven or nonwoven web, the web comprising a fiber comprising a thermoplastic polymer composition comprising a blend of a polyolefin resin and a chemically-modified polyolefin resin or a blend of thermoplastic resins (e.g., PE, PP, PET and polylactic acid (PLA)). The article comprises a nonwoven web comprising a spunbond fabric, a meltblown fabric, an electrospun fabric, and combinations thereof. Examples of spunbond fabric and meltblown fabric are known in the art, and may be spun-bond-meltblown-spunbond (SMS), spunbond-meltblown-meltblown-spunbond (SMMS), and like permutations or combinations. Other articles, such as a litter box, shoe box, food storage box or bin, laundry basket, or clothing box or bag may advantageously incorporate liners having compositions of the invention incorporated therein. Further, the polyolefin used in disposable plastic garbage bags, garment bags, diaper bags, vacuum cleaner bags, and the like can also be made using polymer with an effective amount of polyolefin having covalently bonded CD. In embodiments, any of the abovementioned articles or components can be prepared or processed with any of the abovementioned processes or any of the following melt based processes to form a desired article or component structure, and combinations thereof, including: spunbond, meltblown, nanofiber, porous film, or co-form. In embodiments, any of the abovementioned articles or components can also be prepared or processed with any of the following staple-based or natural fiber based processes or structures, and combinations thereof, including: hydroentanglement, bonded-carded, needle punched, airlaid, wetlaid, and like processes and structures, or combinations thereof.

Fiber in this disclosure refers to generally continuous lengths of materials having a diameter of about 0.1 micron to 200 microns and about 2 to 50 microns. Such fiber can be used as fluff, as a web, a woven or non-woven fabric or as a composite material. The webs and fabrics fashioned there from can also comprise bicomponent fibers. Bicomponent fiber technology enables manufacturers to, for example: reduce cost; improve strength and softness; produce ultrafine fibers; provide improved loft, crimp, or both; and like process and product improvements. One type of bicomponent fiber is a known material in which the fiber contains an amount of polymer having a relatively high melting point and a second amount of a polymer having a relatively low melting point. In the formation of a web or layer of a web, the fiber is heated to a temperature such that the low melting point polymer can melt, fuse and bind the layer or web into a mechanically stable, unitary mass. The relatively high melting point polymer component can provide mechanical strength and stability to the layer or web. Bicomponent fibers can thus allow the fabrication of thermally bonded webs, thus providing additional strength, cohesiveness, and robustness of nonwoven webs made from them. Where such properties are desired, use of bicomponent fiber is often sufficient to impart these properties and no further binders or procedures are required to provide the web with additional cohesiveness, strength, etc. Some embodiments of the invention may also comprise nanofiber. Nanofiber can be formed, for example, by electrospinning, where fibers are spun with diameters of from about 10 nm to several hundred nm. The resulting fiber properties can depend on, for example, field uniformity, polymer viscosity, electric field strength, the distance between nozzle and collector, and like considerations.

Web production methods useful for fiber and fabric preparation can include any other suitable method, such as extrusion. Co-extrusion, spunlace, porous film, co-form, bonded-carded, needle punch, airlaid, wetlaid, and like methods, or combinations thereof. Spunlace processing, also known as hydroentangling, involves mechanically wrapping and knotting fibers in a web through the use of high velocity jets of water. Spunlaced nonwovens work well for wipes because they are soft, strong, easy to handle, and provide good absorption. In embodiments, methods useful for fiber and fabric preparation can additionally include any other suitable processing methods, for example, thermo-bonding, chemical or resin bonding, and like methods. In some embodiments, fibers, fabrics and absorbent materials of the invention can include other suitable functional or performance additives or treatments, for example, an antimicrobial, an anti-static agent, a flame retardant, a fluorochemical, a wetting agent, an ultraviolet stabilizer, a laminate, a binder or an adhesive, a hot melt adhesive, a filler, a silane coupling agent, and like additives or treatments, or combinations thereof. In embodiments, depending upon its disposition and purpose in the fiber or final article, an additive can be included, for example, in a masterbatch, added directly to an extruder, applied topically to a fiber or web surface, and like inclusion methods, or combinations thereof. In embodiments, a binder or an adhesive can include, for example, an acrylic, a hot melt, a latex, a polyvinyl chloride, a pressure sensitive adhesive, a styrenated acrylic, styrene butadiene, vinyl acetate, ethylene vinyl acetate, vinyl acrylic, a melt-fusible fiber, a partially meltable bicomponent fiber (e.g., PE/PP, PE/PET, specially formulated PET/PET), and like materials, or combinations thereof.

The coatings can be made by contacting a surface such as a thermoplastic film, fiber, nonwoven etc., with a solution of both the Fe(III) compound and the PEI.

The thermoplastic materials can be coated with aqueous or co-solvent based coating. Preferred co-solvents are benign liquid media such as lower alcohols, glycol, glycol ethers, glycol esters or aqueous media. Coatings are typically made by blending the coating components into the liquids to form a coating solution. The solution can contain the active Fe(III) material and PEI with conventional additives, co-solvents, dyes, etc. The coating solution can then be coated using conventional coatings technology including knife coating, roll coating, slot coating, saturation coating, flooded nip coating, rod coating, curtain coating, spray coating, gravure coating, etc.

Fe(III) or PEI compounds, or both, can be uniformly surface coated onto a particulate to increase surface area such as on a silica particle or on to CD particles prior to grafting CD onto functionalized polyolefin by reactive extrusion. The Fe(III)/PEI coating and drying of the particulate are carried out concurrently in a dryer providing heating in a controlled atmosphere. A stainless steel tumble dryer, jacketed with circulating oil heating walls, and equipped with a liquid spray bar running along the center of horizontal rotation of the dryer can be used to spray the aqueous PEI coating solution onto the particulate in constant motion. The vacuum lowers the boiling point of the water, while particle contact with the vessel walls provides fast heat input for uniform drying. This coating process prevents lumping, segregation and allows uniform PEI coating of the CD particles.

The compositions can be made with amounts of the components as shown in the following tables.

Solvent Coating Compositions

| Components | First Embodiment (Wt. %) | Second Embodiment (Wt. %) | Third Embodiment (Wt. %) |
|---|---|---|---|
| Solvent | 40-99 | 70-95 | 75-90 |
| Co-Solvent | 0.1-20 | 1-15 | 2-10 |
| Polyethylenimine | 0.01-15 | 0.02-10 | 0.03-9 |
| Fe(III) Compounds | 0.01-15 | 0.02-10 | 0.03-9 |

Aqueous Coating Compositions

| Components | First Embodiment (Wt. %) | Second Embodiment (Wt. %) | Third Embodiment (Wt. %) |
|---|---|---|---|
| Water | 40-99 | 70-95 | 75-90 |
| Co-Solvent | — | 1-30 | 2-25 |
| Polyethylenimine | 0.01-15 | 0.02-10 | 0.03-9 |
| Fe(III) Compounds | 0.01-15 | 0.02-10 | 0.03-9 |

The coatings can be continuous or partial coatings. The coatings can be made on film, fiber, fabric (non-woven or woven), container, sheet or other polymer format. The coatings can have a thickness of about 0.5 to 25 microns, 1 to 20 microns or 5 to 10 microns. The add-on amounts to non-woven can be about 30 to 800 micrograms·cm$^{-2}$, about 50 to 600 micrograms·cm$^{-2}$ or about 100 to 400 micrograms·cm$^{-2}$. The add-on amounts to fiber can be about 15 to 300 milligrams-gm$^{-1}$, about 25 to 225 milligrams-gm$^{-1}$ or about 50 to 175 milligrams·gm$^{-1}$. The add-on amounts to container, film or sheet can be about 30 to 800 micrograms·cm$^{-2}$, about 50 to 600 micrograms·cm$^{-2}$ or about 100 to 400 micrograms·cm$^{-2}$.

The adsorbent compositions illustrated above are normally dispersed in solvent, in aqueous medium, solvent and water or water with useful co-solvents. The aqueous compositions are then applied to a substrate to reduce unwanted or target substances from an enclosed volume which the substrate is exposed. The amount of the composition used in or applied to may vary depending on the nature of the substrate (i.e., fiber or film) and the intended application. In most embodiments, the odor control composition constitutes from about 2.5 to about 50 wt. % of the substrate, in some embodiments from about 5 to about 30 wt. % of the substrate, and in some embodiments, from about 10 to about 20 wt. % of the substrate. The adsorbent composition may be applied to a substrate using any of a variety of well-known application techniques. For instance, the composition may be incorporated within the matrix of the substrate and/or applied to the surface thereof. Suitable techniques for applying an aqueous composition to a substrate include spraying, dipping, aqueous coating, printing, and so forth. Techniques for applying non-aqueous compositions include various melt extrusion techniques previously described.

The compositions can be incorporated into a variety of articles including film, non-wovens, sachets, inserts, filters, couplings, vents, caps, closures, trays, lids, laminated foils, sheets, etc.

A food package article or food package component of the disclosure can be, for example, a package component such as a tray, a packing liner, a barrier layer, a scavenger layer, and like components, or combinations thereof. Long-established food packaging concepts are limited in their ability to extend the shelf-life of food products. Innovative food packaging concepts of the disclosure can, for example, interact with the environment inside the package and respond by changing their properties to maintain, adjust or improve the specific package headspace atmosphere or minimize food flavor loss to the package by "scalping" (i.e., uptake of volatile components by the polymeric package material from the food) thereby adding to product quality and extending shelf-life. The most notable group of technologies in use today for controlling package headspace oxygen is oxygen scavengers.

The present disclosure relates to the use of the packaged food contact polymer layer to selectively remove undesirable off-flavors from the packaged foods. A food package contact layer can be constructed to remove offensive odors/aromas from the interior of food packages produced by, for example, lipid oxidation, lipid hydrolysis, protein/amino acid breakdown, and like changes or reactions of the packaged food. These active packaging polymer improvements of the disclosure are significant compared to conventional polyolefins and can considerably improve food taste over the shelf-life term of the product.

A film or a multilayer film can be used as a food packaging film, wherein at least one layer has a composition that can adsorb off odors or plant hormones such as ethylene in static condition and obtain surprising adsorption in dynamic conditions. Principal manufacturing processes used in producing packaging materials include, for example, cast film extrusion, blown-film extrusion (tubular), extrusion coating, extrusion lamination, adhesive laminations, oriented extruded films, blow molding, injection molding, and compression molding. For packaging purposes, thermoplastics can usually be processed into one of the following structural categories: flexible films, rigid sheets, bottles and tubs. The film can contain a source of ferric Fe(III) iron and a polyethylenimine (PEI) or a coating thereof. The adsorbent composition can comprise a coating comprising a Fe(III) compound and a PEI compound in at least a monolayer coating. In yet another embodiment of the invention, CD grafted polymers of the invention can be provided as a Fe(III) or PEI coated web of film or as nonwoven fibers, wherein a piece of web is simply added to a package that is then filled with fresh fruits, vegetables, or flowers. In such an embodiment, the packaging material used can be any suitable material and is not limited in any way. Commonly used packaging materials such as polyethylene, PLA or polyester, and the like can be used without any limitation, as the composition of the invention is simply added to the finished packaging along with the fresh produce to be packaged. Since the composition is present in a separate material, it can be added to any package where undesirable vapor phase substances are desirably scavenged.

The compositions may be formed into a face mask. A face mask can use the materials to reduce halitosis. The adsorbent uses at a minimum a combination of a polyethyleneimine (PEI) and an Fe(III) compound sufficient to achieve at least 20% reduction in $H_2S$. The combination of the polymeric amine compound and the iron compound provides enhanced removal of malodorous compounds such as hydrogen sulfide, alkyl sulfide, small molecule $C_{3+}$ acids or alcohols, diethylamine and other compounds known to cause offensive or malodorous breath and achieves surprising dynamic activity.

Disposable face masks have been manufactured for many years. Face masks include a plurality of layers of selected fibrous materials. This invention relates to disposable face mask materials having a relatively low pressure drop to permit easy breathing, while preventing odorous vapors from passing through the mask structure. The inventive face mask materials comprise different types of fibrous nonwoven (e.g., spunbond, meltblown and spunbond/meltblown) or cellulosic filter material having a range of basis weights. The selection of these materials provide for the desired degree of filtering or barrier to germs while at the same time having the desired properties to mitigate unpleasant odor in air passing through the mask to the wearer or through the mask from the exhaled breath of the mask wearer. Materials used in a face masks are meant to help block large-particle droplets, splashes, sprays or splatter that may contain germs (viruses and bacteria) from reaching the wearer's mouth and nose. Face masks may also help reduce exposure of the wearer's saliva and respiratory secretions to others. The mask has significant technical advantages in that the face mask materials provide for germ barrier properties and, in addition, prevents the passage of odorous vapors (e.g., hydrogen sulfide—$H_2S$, methanethiol—$CH_3SH$, dimethylsulfide—$CH_3SCH_3$). Desirable barrier materials are engineered to freely pass air in either direction, while restricting the passage of odorous vapor components. It will be appreciated that more than one non-woven or cellulosic barrier material may be used to accomplish specific performance requirements.

Breathed air treatment is achieved by air flow through most of the area of the face mask. One or more layers of fibrous filter material in the mask are surface treated with a composition to remove noxious vapors including non-condensable gasses from the air passing either direction through the mask. Surface treatment compositions do not change the modulus in nonwoven face mask materials. Typical disposable face masks comprise three layers—an outer layer, an inside layer and interior mask layer. Any layer or combinations can be coated. The outermost face mask layer serves as a partial barrier to droplets, splashes, sprays or splatter. Face masks are held to minimum requirements in Bacterial Filtration Differential, Pressure Efficiency (BFE), Sodium Chloride Aerosol Challenge-NIOSH, Viral Filtration Efficiency (VFE) and Synthetic Blood Penetration-Splash Resistance.

The Bacterial Filtration Efficiency (BFE) test is performed on filtration materials and devices such as face masks, surgical gowns, caps, and air filters, which are designed to provide protection against biological aerosols. The test determines the filtration efficiency of these materials when challenged with a biological aerosol of *Staphylococcus aureus*. The BFE test procedure is based on Military Specification 36954C and can evaluate filtration efficiencies up to 99.9%. This test is required by the ASTM F2100 and EN 14683, as well as used for 510K submissions to the FDA. The test is performed in compliance with Military Specification 36954C, ASTM F2101, and ASTM F2100.

The Differential Pressure test determines the air exchange differential of porous materials such as surgical face masks and other filtration devices. This test was designed after the Military Specification 36954C and is commonly requested for samples submitted for Bacterial Filtration Efficiency (BFE) testing. The test is required by ASTM F2100, EN 14863, and is used for 510K submissions to the FDA.

The Sodium Chloride Aerosol Challenge (NaCl)—NIOSH Respirator Pre-qualification test uses a widely accepted method for evaluating particle penetration and air flow resistance properties of a variety of filtration materials. This test is able to determine filtration efficiency measurements up to 99.999%. Respirators must be pre-qualified before submitting to NIOSH for certification; other materials, such as breathing system filters and face masks, are tested to determine filtration efficiency for marketing. Testing is performed in compliance with 42 CFR Part 84 and NIOSH Procedure No. RC-APR-STP-0057, 0058, and 0059.

The Viral Filtration Efficiency test determines the filtration effectiveness of various filtration materials such as masks and filter material. This test is necessary for making marketing claims as to the viral filtration efficiency of the mask or other filter material. This test has been adapted from the ASTM F2101

The Synthetic Blood Penetration—Splash Resistant test is one of two different synthetic blood resistance tests offered by Nelson Labs to determine a product's ability to act as a barrier to blood-borne pathogens. The Splash Resistant test method challenges medical face masks with a fixed volume of synthetic blood directed at high velocity at the center of the mask. This test is required by ASTM F2100 and is tested in compliance with ASTM Method F1862, ASTM F2100, and EN14683.

The mask has an outer layer, an interior comfort layer adjacent to the skin and one or more inside adsorbent layers placed there between. These layers are made of spunbond, meltblown or cellulosic materials typical in this manufacture. Such materials include a spunbond with a basis weight about 20 to 30 $g \cdot m^{-2}$; a meltblown with a basis weigh of about 17 to 26 $g \cdot m^{-2}$; a combined meltblown/spunbond with a basis weight of about 30 to 40 $g \cdot m^{-2}$; a cellulose comfort layer can be used with a basis weight of about 17 to 21 $g \cdot m^{-2}$.

The outer mask layer can be constructed from nonwovens such as spun bond polypropylene, a cellulosic tissue or spun bond polyester. Spun bond fiber may also be made of bicomponent fiber with, for example, polyethylene. The outer layer typically has preferably a basis weight range of 15 to 35 g·m$^{-2}$ (0.45 oz·yd$^{-2}$ to 1.0 oz·yd$^{-2}$).

Interior comfort mask layer is preferably composed of nonwovens. These layers may also be constructed from polyester and/or polyolefin(polyethylene or polypropylene) material or cellulosic tissue. Inner layers typically have a basis weight range of 13 to 30 g·m$^{-2}$ (0.4 oz·yd$^{-2}$ to 0.85 oz·yd$^{-2}$), preferably about 13-25 g·m$^{-2}$ in basis weights. The interior layers can be effectively coated.

The inside adsorbent mask layer can be a meltblown polyolefin woven or non-woven with a basis weight of 15 to 30 g·m$^{-2}$ and an adsorbent coating. One embodiment is typically constructed from a meltblown polypropylene, but may be constructed from meltblown polyolefin, polyester or urethane. The layer(s) may include one two or multiple coated or uncoated interior layers. The interior layer material has good gas permeability characteristics and permits air to pass through the filter body in both directions. The interior layer is a nonwoven with the adsorbent compositions preferably in a fiber coating. Covering the nose and mouth with the face mask results in warm, moist air exhaled by the wearer. The exhaled air has a tendency to result in the high concentration of moisture vapor contained within the mask. Removal of odorous vapors is not affected as moisture accumulates on the surface of the fiber during use.

We have shown a substantial improvement in adsorption as tested by a dynamic hydrogen sulfide ($H_2S$). Dynamic $H_2S$ test method involves analytical techniques designed to measure the odor attenuation performance of a nonwoven face mask structure using a dynamic olfactometer presentation gradient of $H_2S$. The test olfactometer simulates a dynamic hydrogen sulfide concentration based on the distance of 12 inches (30.5 cm) from source using a flow rate of 7 liters per minute. For example, a hydrogen sulfide concentration of 200 ppb measured in the oral cavity will have a concentration of 20 ppb at the typical distance of 12 inches at a 10 liter/minute breathing rate. Oral cavity hydrogen sulfide can range from less than 20 ppb (vol/vol) to more than 1,000 ppb (vol/vol). Sulfur gases such as hydrogen sulfide and methylmercaptan (methanethiol) ($CH_3SH$) together are often implicated for halitosis malodors. "Socially accepted" oral cavity hydrogen sulfide is less than 250 ppb (vol/vol). The method measures the attenuation of $H_2S$ across the face mask structure. This procedure allows for the determination of the following compound:

| Malodor and Concentration | |
|---|---|
| Test Compound | ppb (nl/L) |
| Hydrogen sulfide ($H_2S$) | 5 to 500 |

In this test method, three steps are involved. They are (a) the instrument sensitivity calibration, (b) dynamic face mask testing to measure $H_2S$ attenuation, and (c) the quality control of the test.

Face mask structure is tested in a 13 cm diameter glass permeation cell (FIG. 1) mounted on an olfactometer. FIG. 1 shows a glass test a device for testing mask structure under dynamic flow of hydrogen sulfide. In FIG. 1 the glass test device 10 includes a first enclosure 12 a and a second enclosure 12 b. The volume is defined by enclosures 12 AM 12 be a separated by the test nonwoven 11 positioned therebetween. The inflow 13 is provided continuously at a defined rate by an olfactometer device (not shown). The outflow 14 is measured for hydrogen sulfide using an appropriate measuring device. Aluminum clamp rings, fitted on either side of the glass flask flanges, are tightened using six screws to hermetically sealing the face mask structure between the two flasks glass flanges. Dynamic flow from the olfactometer (St. Croix Sensory AC'SCENT® Olfactometer) is delivered into the inflow end of the permeation cell at 7 liters per minute for a 15 consecutive minute test period for a total flow volume of 105 liters. A Jerome 631-X hydrogen sulfide test meter is used to measure the $H_2S$ concentration as a function of time; inflow and outflow $H_2S$ concentrations are measured. Before starting the test, nonwoven webs mounted in the permeation cell are humidified by breathing across the fibers with seven lung volumes of air. The permeation cell is then mounted over the olfactometer flow port. Three hydrogen sulfide measurements are taken at 1, 5 and 15 minutes in duplicate. The values are average over the 15 minute test period and reported in ppb (vol/vol).

Hydrogen sulfide is a common test malodor and can be used to predict the activity of other sulfur compound malodors. The attenuation rate (percent reduction) of $H_2S$ is calculated from average $H_2S$ concentrations of control and coated samples. An $H_2S$ reduction greater than 20% is acceptable as an indication that malodor control can be achieved. The performance of the coated nonwoven fiber face mask structure is determined from the $H_2S$ vapor mass taken up by the coated fiber compared to the control mask structure over the fifteen minute test time (control fiber structure–coated fiber structure)÷control fiber structure× 100=% $H_2S$ Reduction.

The hydrogen sulfide sorptions of compositions illustrated below are applied to a fiber substrate to mitigate unwanted or target substances passing through fibrous layers of a face mask. The amount of the composition used or applied to the fiber surface may vary depending on the non-woven (e.g., spunbond, meltblown and spunbond/meltblown) or cellulosic filter material as well as the material basis weight and the intended application. In most embodiments, the odor control composition constitutes from about 1.5 to about 30 wt. % of the substrate, in some embodiments from about 3 to about 20 wt. % of the substrate, and in some embodiments, from about 5 to about 10 wt. % of the substrate. The composition may be applied to a substrate using any of a variety of well-known application techniques. For instance, the aqueous compositions can be applied to the surface using suitable techniques including spraying, dipping, aqueous coating, etc. The compositions can be made with amounts of the components as shown in the following table.

| | Fiber Coating Compositions | | |
|---|---|---|---|
| Components | First Embodiment (Wt % on polymer) | Second Embodiment (Wt % on polymer) | Third Embodiment (Wt % on polymer) |
| Fiber substrate | 98 | 90 | 70 |
| Polyethylenimine | 1.5 | 6 | 10 |
| Ferric Hydroxide | 0.5 | 4 | 20 |

| Optimum Coating Formula | | |
|---|---|---|
| Materials | Wt.-% on solution | Wt.-% on solids |
| PEI EPO MIN | 0.65 | 19 |
| FeCl$_3$ | 1.25 | 37 |
| KOH | 1.5 | 44 |
| Deionized Water (pH 12.5) | 96.6 | — |
| Totals | 100 | 100 |

In the examples section below, material compositions and detailed sample preparation information for each coated fibrous material is provided.

EXAMPLE 1

Aqueous coating solutions are prepared in 100 gram and 50 grams batches for hand coating fiber substrates. With coating formulations A and B, the order of addition is water and potassium ferrate. The solution is mechanically stirred until a reddish ferric hydroxide floc forms, then ethanol and glycerin are added. Lastly, Polyethylenimine (Aldrich 181978) is added as a 10 wt.-% solution (water accounted for in overall formulation).

Meltblown (MB) nonwoven polypropylene fiber and cellulosic paper samples (stored in a 20° C./50% RH room) are cut into 16.5 cm×16.5 cm hand sheets and accurately weighed to 0.1 milligrams. MB fiber control is 27 g/m² polypropylene; the coated MB fiber contained 2 wt % alpha CD grafted onto maleic anhydride grafted polypropylene.

Two basis weight cellulosic papers (15 g/m² and 65 g/m²) are tested.

An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller.

Cellulosic paper sheets are starch sized requiring a rubber ink roller to uniformly disperse the coating solution into the fiber. The sheet is turned over and the coating process is repeated.

Coated sample sheets are place on a porous drying screen and allowed to air dry overnight in a 20° C./50% RH room. Coated sheets are re-weighed and coating weight calculated (coated sheet wt.−uncoated sheet wt.)/uncoated sheet wt.× 100%=coating wt %. Coating formulation C is prepared from a borate/phosphate buffer. A 0.001 molar sodium borate solution (1 mM NaOH, pH ~8.2) is prepared by adding 0.040 g NaOH (50% Solution), to 500 ml distilled water, then 0.118 g boric acid. Final solution is filtered by 0.2 micron filter membrane. The 0.005 molar phosphate/ 0.001 molar borate buffer (pH ~9) is prepared by adding 0.670 g Na₂HPO₄.7H₂O to 500 mL borate solution. The potassium ferrate, ethanol, glycerin and polyethylenimine are added as previously described. Coated sheets are prepared and coating weights determined as expressed above.

Hydrogen sulfide sorption is determined by the dynamic hydrogen sulfide test method for control (uncoated) MB nonwoven and cellulosic paper sheets and identical sample sheets coated with coating formulations A, B and C. A plurality of layers of selected fibrous materials—MB polypropylene and cellulosic paper—is tested using the previously described hydrogen sulfide sorption method. Control sheets were found to sorb no hydrogen sulfide by comparing upstream hydrogen sulfide measurements before the sample test sheets and down stream hydrogen sulfide measurements after passing through the sample test sheets.

| Material | A Wt.-% | B Wt.-% | C Wt.-% |
|---|---|---|---|
| Polyethylenimine | 0.50 | 0.50 | 0.50 |
| Ethanol | 5.0 | 5.0 | 5.0 |
| Glycerin | 0.50 | 0.50 | 0.25 |
| Potassium Ferrate | 0.04 | 0.09 | 0.04 |
| 0.001M borate/0.005M phosphate buffer | | | 94.2 |
| D.I. Water | 94.0 | 94.0 | |
| Total | 100.0 | 100.0 | 100 |
| pH | 12.0 | 12.0 | 8.0 |

| Number Layers Meltblown | Basis Wt. g/m² | Coating ID | Surface Coating Wt.-% | Ave. H₂S Conc. ppb (vol/vol) | % H₂S Reduction |
|---|---|---|---|---|---|
| 2 | 27 | Ctrl | — | 23.4 | — |
| 1 | 27 | A | 2.5 | 19.8 | 16 |
| 2 | 27 | Ctrl | — | 21.0 | — |
| 3 | 27 | B | 2.7 | 19.8 | 6 |
| 1 | 27 | B | 2.7 | 16.0 | 24 |
| 1 | 27 | B | 2.7 | 16.8 | 20 |
| 2 | 27 | Ctrl | — | 22.8 | — |
| 2 | 27 | C | 2.5 | 21.4 | 6 |
| 2 | 27 | C | 2.5 | 20.2 | 11 |
| 2 | 27 | Ctrl | — | 25.3 | — |
| 2 | 27 | B | 30 | 15.8 | 38 |

| Number Layers Cellulose | Basis Wt. g/m² | Number Layers Cellulose | Basis Wt. g/m² | Coating ID | Surface Coating Wt.-% | Ave. H2S Conc. ppb (vol/vol) | % H₂S Reduct'n |
|---|---|---|---|---|---|---|---|
| 3 | 15 | — | — | — | — | 24.5 | — |
| 3 | 15 | — | — | B | 27 | 19.5 | 20 |
| 1 | 65 | 1 | 27 | — | — | 32 | — |
| 1 | 65 | 1 | 27 | B | 15/30 | 18.3 | 43 |

EXAMPLE 2

The aqueous coating solution is prepared in 100 gram and 50 grams batches for hand coating fiber substrates. The order of addition is water and potassium ferrate. The solution is stirred until a reddish ferric hydroxide floc forms, then ethanol is added. Lastly, Polyethylenimine (Aldrich 181978) is added as a 10 wt.-% solution (water accounted for in overall formulation). A plurality of layers of nonwoven materials—meltblown (MB) and spunbond (SB) polypropylene—(stored in a 20° C./50% RH room) are cut into 16.5 cm×16.5 cm hand sheets and accurately weighed to 0.1 milligrams. Polypropylene MB and SB fiber controls are 21 g/m² and 27 g/m² webs, respectively; the coated spunbond fiber samples contained 2 wt % alpha CD grafted to maleic anhydride grafted polypropylene while the meltblown doesn't contain CD. Cellulosic paper webs are 19 g/m². An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller. Cellulosic paper sheets are starch sized requiring a rubber ink roller to uniformly disperse the coating solution into the fiber. The sheet is turned over and the coating process is repeated. Coated sample sheets are place on a porous drying screen and allowed to air dry overnight in a 20° C./50% RH room. Coated sheets are re-weighed and coating weight calculated. Coating formulation C is prepared from a borate/phosphate buffer.

Hydrogen sulfide sorption is determined by the dynamic hydrogen sulfide test method for control (uncoated) MB nonwoven and cellulosic paper sheets and identical sample sheets coated with coating formulation. A plurality of layers of selected fibrous materials—MB, SB and cellulosic paper—is tested. Control sheets were found to sorb no hydrogen sulfide by comparing upstream hydrogen sulfide measurements before the sample test sheets and down stream hydrogen sulfide measurements after passing through the sample test sheets.

| Material | Wt.-% |
|---|---|
| Polyethylenimine | 1.0 |
| Ethanol | 10.0 |
| Potassium Ferrate | 0.35 |
| D.I. Water | 88.65 |
| Total | 100.0 |
| pH | 12.2 |

| Number Layers MB | Basis Wt. g/m$^2$ | Number Layers SB | Basis Wt. g/m$^2$ | Number Layers Cellulose | Basis Wt. g/m$^2$ | Coating ID | Surface Coating Wt.-% | Ave. H$_2$S Conc. ppb (vol/vol) | % H$_2$S Reduction |
|---|---|---|---|---|---|---|---|---|---|
| 1 | 21 | 1 | 27 | 1 | 19 | Ctrl | — | 29.5 | — |
| 1 | 21 | 1 | 27 | 1 | 19 | Ex 2 | 22/12/6 | 21.1 | 28 |
| 1 | 21 | 2 | 27 | | | Ex 2 | 10/11.5 | 18.6 | 37 |

EXAMPLE 3

Aqueous coating solutions are prepared in 100 gram and 50 grams batches for hand coating fiber substrates. With coating formulations D, E and F, the order of addition is water and potassium ferrate. The solution is mechanically stirred until a reddish ferric hydroxide floc forms. Lastly, Polyethylenimine (Aldrich 181978) is added as a 10% solution (water accounted for in overall formulation). A plurality of layers of nonwoven materials—spunbond/meltblown (S/M) and spunbond (SB)—(stored in a 20° C./50% RH room) are cut into 16.5 cm×16.5 cm hand sheets and accurately weighed to 0.1 milligrams. The polypropylene S/M and SB fiber control are 30 g/m$^2$ and 27 g/m$^2$, respectively. The coated SB fiber samples contained 2 wt % alpha CD grafted onto maleic anhydride grafted polypropylene. Coated S/M fiber is not CD modified. An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller. The sheet is turned over and the coating process is repeated. Coated sample sheets are place on a porous drying screen and allowed to air dry overnight in a 20° C./50% RH room. Sample sheets are weighed and coating weights calculated.

Hydrogen sulfide sorption is determined by the dynamic hydrogen sulfide test method for control (uncoated) meltblown nonwoven and cellulosic paper sheets and sample sheets coated with coating formulations D, E and F. A plurality of layers of selected fibrous materials—S/M, MB and cellulosic paper—is tested. Control sheets were found to sorb no hydrogen sulfide by comparing upstream hydrogen sulfide measurements before the sample test sheets and downstream hydrogen sulfide measurements after passing through the sample test sheets. At the end of the 15 minute sorption test, coated nonwoven fibers mounted in the permeation cell are re-humidified by breathing across the fibers with seven lung volumes of air. The permeation cell is then re-mounted over the olfactometer flow port. Two hydrogen sulfide measurements are taken at 17 minutes. The re-humidified 17 minute average values are about 4 ppb (vol/vol) lower then the 15 minute reading. Re-humidified uncoated control nonwoven fiber showed about one ppb (vol/vol) lower the 15 minute reading.

| Material | D Wt.-% | E Wt.-% | F Wt.-% |
|---|---|---|---|
| Polyethylenimine | 1.2 | 0.65 | 0.30 |
| Potassium Ferrate | 1.0 | 1.0 | 1.0 |
| D.I. Water | 97.8 | 98.3 | 98.7 |
| Total | 100.0 | 100 | 100.0 |
| pH | 12.5 | 12.2 | 12.0 |

| Number Layers S/M | Basis Wt. g/m$^2$ | Number Layers SB | Basis Wt. g/m$^2$ | Coating ID | Surface Coating Wt.-% | Ave. H$_2$S Conc. ppb (vol/vol) | % H$_2$S Reduct'n |
|---|---|---|---|---|---|---|---|
| | | 2 | 27 | Ctrl | — | 27.4 | — |
| | | 2 | 27 | D | 24 | 19.8 | 28 |
| | | 2 | 27 | E | 12 | 18.6 | 32 |
| | | 2 | 27 | F | 13 | 20.0 | 27 |
| 2 | 30 | | | E | 13 | 17.3 | 37 |
| 2 | 30 | 1 | 27 | Ctrl | — | 30.1 | — |
| 2 | 30 | 1 | 27 | E | 17/21 | 37 | 37 |
| 2 | 30 | 1 | 27 | E | 17/21 | 41 | 41 |
| | | 2 | 27 | Ctrl | — | 29 | — |
| | | 2 | 27 | E | 13 | 19.6 | 32 |

-continued

| Number Layers S/M | Basis Wt. g/m² | Number Layers SB | Basis Wt. g/m² | Coating ID | Surface Coating Wt.-% | Ave. H₂S Conc. ppb (vol/vol) | % H₂S Reduct'n |
|---|---|---|---|---|---|---|---|
|  |  | 2 | 27 | E | 13 | 20.9 | 28 |
|  |  | 2 | 27 | E | 3 | 17.1 | 41 |

EXAMPLE 4

The aqueous coating solution is prepared in 100 gram and 50 grams batches for hand coating fiber substrates. The order of addition is water and potassium ferrate. The solution is mechanically stirred until a reddish ferric hydroxide floc forms. Then polyethylenimine (Aldrich 181978) is added as a 10 wt.-% solution (water accounted for in overall formulation). Meltblown (MB) nonwoven polypropylene fiber and cellulosic paper samples (stored in a 20° C./50% RH room) are cut into 16.5 cm×16.5 cm hand sheets and accurately weighed to 0.1 milligrams. MB fiber control is 27 g/m² polypropylene; the coated MB fiber contained 2 wt % alpha CD grafted onto maleic anhydride grafted polypropylene. The cellulosic paper—control and coated samples—is 55 g/m². An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller. The sheet is turned over and the coating process is repeated. Cellulosic paper sheets are starch sized requiring a rubber ink roller to uniformly disperse the coating solution into the fiber. Coated sample sheets are place on a porous drying screen and allowed to air dry overnight in a 20° C./50% RH room. Sample sheets are weighed and coating weights calculated.

Hydrogen sulfide sorption is determined by the dynamic hydrogen sulfide test method for control (uncoated) MB nonwoven and cellulosic paper sheets and sample sheets coated with coating formulation. A plurality of layers of selected fibrous materials—MB polypropylene and cellulosic paper—is tested. Control sheets were found to sorb no hydrogen sulfide by comparing upstream hydrogen sulfide measurements before the sample test sheets and down stream hydrogen sulfide measurements after passing through the sample test sheets.

| Material | Wt.-% |
|---|---|
| Polyethylenimine | 0.77 |
| Potassium Ferrate | 3.80 |
| D.I. Water | 95.43 |
| Total | 100.0 |
| pH | 12.2 |

| Number Layers Meltblown | Basis Wt. g/m² | Coating ID | Surface Coating Wt.-% | Ave. H₂S Conc. ppb (vol/vol) | % H₂S Reduct'n |
|---|---|---|---|---|---|
| 2 | 27 | — | — | 32.9 | — |
| 2 | 27 | Ex 4 | 19 | 29.8 | 10 |
| 2 | 27 | Ex 4 | 17 | 29.0 | 12 |

| Number Layers Cellulose | Basis Wt. g/m² | Coating ID | Surface Coating Wt.-% | Ave. H₂S Conc. ppb (vol/vol) | % H₂S Reduct'n |
|---|---|---|---|---|---|
| 1 | 55 | — | — | 23.1 | — |
| 1 | 55 | Ex 4 | 2 | 15.6 | 32 |

EXAMPLE 5

Aqueous coating solutions are prepared in 100 gram and 50 grams batches for hand coating fiber substrates. With coating formulations G and H, the order of addition is water and ferric chloride. The solution is mechanically stirred to dissolve the ferric chloride. Next, the ferric chloride solution is neutralized with 10 wt.-% potassium hydroxide (water accounted for in overall formulation) producing a ferric hydroxide floc. Then polyethylenimine (Aldrich 181978 or EPOMIN P1000) is added as a 10 wt.-% solution (water accounted for in overall formulation). Final coating solution pH is adjusted with 10% potassium hydroxide to pH 12.5. Spunbond (SB) nonwoven polypropylene fiber samples (stored in a 20° C./50% RH room) are cut into 16.5 cm×16.5 cm hand sheets and accurately weighed to 0.1 milligrams. SB fiber control is 27 g/m² polypropylene; the coated SB fiber contained 2 wt % alpha CD grafted onto maleic anhydride grafted polypropylene. An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller. The sheet is turned over and the coating process is repeated. Coated sample sheets are place on a porous drying screen and allowed to air dry overnight in a 20° C./50% RH room. Sample sheets are weighed and coating weights calculated.

Hydrogen sulfide sorption is determined by the dynamic hydrogen sulfide test method for control (uncoated) spunbond non-woven and 2 wt % alpha CD grafted onto maleic anhydride grafted polypropylene SB sample sheets coated with coating formulation. A plurality of layers of SB fiber is tested. Control sheets were found to sorb no hydrogen sulfide by comparing upstream hydrogen sulfide measurements before the sample test sheets and down stream hydrogen sulfide measurements after passing through the sample test sheets. At the end of the 15 minute sorption test, coated SB fibers mounted in the permeation cell are re-humidified by breathing across the fibers with seven lung volumes of air. The permeation cell is then re-mounted over the olfactometer flow port. Two hydrogen sulfide measurements are taken at 17 minutes. The re-humidified 17 minute average values are about 3 ppb (vol/vol) lower the 15 minute reading. Re-humidified uncoated control nonwoven fiber showed about one ppb (vol/vol) lower the 15 minute reading.

| Material | G Wt.-% | H Wt.-% |
|---|---|---|
| Polyethylenimine (Aldrich 181978) | 0.65 | |
| Polyethylenimine (EPOMIN P1000) | | 0.65 |
| Ferric Chloride | 1.35 | 1.25 |
| Potassium hydroxide | 1.12 | 1.12 |
| D.I. Water | 96.88 | 96.98 |
| Total | 100.0 | 100.0 |
| pH | 12.5 | 12.5 |

| Number Layers Spunbond | Basis Wt. g/m² | Coating ID | Surface Coating Wt.-% | Ave. $H_2S$ Conc. ppb (vol/vol) | % $H_2S$ Reduction |
|---|---|---|---|---|---|
| 2 | 27 | — | — | 22.1 | — |
| 2 | 27 | G | 13 | 19.3 | 13 |
| 2 | 27 | G | 7 | 18.4 | 17 |
| 2 | 27 | H | 7 | 18.8 | 15 |
| 2 | 27 | H | 1.6 | 21 | 5 |

EXAMPLE 6

The aqueous coating solution is prepared in 100 gram and 50 grams batches for hand coating fiber substrates. The order of addition is water and potassium ferrate. The solution is mechanically stirred until a reddish ferric hydroxide floc forms. Then polyethylenimine (Aldrich 181978) is added as a 10 wt.-% solution (water accounted for in overall formulation). Lastly, fumed silica is mechanically dispersed into the solution. Meltblown (MB) nonwoven polypropylene fiber samples (stored in a 20° C./50% RH room) are cut into 16.5 cm×16.5 cm hand sheets and accurately weighed to 0.1 milligrams. MB fiber control is 27 g/m² polypropylene; the coated MB fiber contained 2 wt % alpha CD grafted onto maleic anhydride grafted polypropylene. An accurate volume of solution is transferred to the sheet using a Mohr pipette. Since the coating solution is hydrophilic relative the hydrophobic polypropylene fiber, the coating solution is dispersed into the fiber sheet uniformly using a rubber ink roller. The sheet is turned over and the coating process is repeated. Coated sample sheets are place on a porous drying screen and allowed to air dry overnight in a 20° C./50% RH room. Sample sheets are weighed and coating weights calculated.

Hydrogen sulfide sorption is determined by the dynamic hydrogen sulfide test method for control (uncoated) MB nonwoven and 2 wt % alpha CD grafted onto maleic anhydride grafted polypropylene MB sample sheets coated with the coating formulation. A plurality of layers of MB polypropylene fiber is tested. Control sheets were found to sorb no hydrogen sulfide by comparing upstream hydrogen sulfide measurements before the sample test sheets and down stream hydrogen sulfide measurements after passing through the sample test sheets.

| Material | Wt.-% |
|---|---|
| Polyethylenimine | 0.65 |
| Potassium Ferrate | 0.70 |
| Fumed silica | 0.50 |
| D.I. Water | 98.15 |
| Total | 100.0 |
| pH | 12.0 |

| Number Layers Meltblown | Basis Wt. g/m² | Coating ID | Surface Coating Wt.-% | Ave. $H_2S$ Conc. ppb (vol/vol) | % $H_2S$ Reduction |
|---|---|---|---|---|---|
| 2 | 27 | — | — | 22.1 | — |
| 2 | 27 | Ex 6 | 7 | 18.8 | 15 |
| 2 | 27 | Ex 6 | 1.6 | 21 | 5 |

The foregoing discloses embodiments of the invention. In the Specification and claims, "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. "Optional" or "optionally" means that the subsequently described event or circumstance may but need not occur, and that the description includes instances where the event or circumstance occurs and instances in which it does not. For example, "A optionally B" means that B may but need not be present, and the description includes situations where A includes B and situations where A does not include B. "Includes" or "including" or like terms means "includes but not limited to." The present invention may suitably comprise, consist of, or consist essentially of, any of the disclosed or recited elements. Thus, the invention illustratively disclosed herein can be suitably practiced in the absence of any element which is not specifically disclosed herein. The use of the singular typically includes and at least does not exclude the plural.

The specification, figures, examples and data provide a detailed explanation of the invention as it has been developed to date. The invention, however, can take the form of nonwovens, fibers, films, sheets, bottles, caps, and other embodiments without departing from the spirit or the intended scope of the invention. The invention therefore resides in the appended claims.

I claim:

1. An adsorbent comprising a nonwoven fabric having a coating, the coating comprising a solid surface, the solid surface comprising an interface with a gas or vapor phase, the solid surface comprising:

a. ferric hydroxide; and
b. an uncomplexed polyethylenimine
wherein the adsorbent is adapted for adsorbing unwanted or target substances from the gas or vapor phase.

2. The adsorbent of claim 1, wherein the ferric hydroxide is the reaction product of a hydroxide reactant and a source of an Fe(III) compound.

3. The adsorbent of claim 1, wherein the polyethylenimine has a molecular weight ($M_n$) of 800 to 1,000,000 and the adsorbent is substantially free of silica.

4. The adsorbent of claim 1, wherein the polyethylenimine is free of substituents.

5. The adsorbent of claim 1, wherein the polyethylenimine comprises an ethoxylated polyethylenimine.

6. The adsorbent of claim 1, wherein there is about 1 to 85 wt % of the ferric hydroxide and 0.1 to 80 wt % of polyethylenimine based on solids content.

7. The adsorbent of claim 1, wherein the ferric hydroxide is the decomposition product of an aqueous solution of a ferrate salt.

8. The adsorbent of claim 1, wherein the fabric has a coated surface area of at least 0.1 $m^2$ $g^{-1}$.

9. The adsorbent of claim 1, wherein the polyethylenimine has a molecular weight ($M_n$) of 800 to 1,000,000 and the adsorbent is free of silica.

10. The adsorbent of claim 1, the adsorbent comprising about 0.1 to 35 wt % of the ferric hydroxide and 0.1 to 35 wt % of polyethylenimine based on the weight of the adsorbent.

11. The adsorbent of claim 1, wherein the nonwoven fabric comprises a polyolefin or a polyester.

12. The adsorbent of claim 1, wherein the fabric comprises a web having a thickness of about 0.01 to 1 mm.

13. The adsorbent of claim 1, wherein the fabric comprises a polyester non-woven.

14. The adsorbent of claim 1, wherein the fabric comprises a polyolefin non-woven.

15. A method of adsorbing unwanted or target substances from a dynamic gas or vapor phase with the adsorbent of claim 1 comprising a nonwoven fabric, the dynamic gas or vapor phase having a concentration of unwanted or target substances of less than 15 ppm, the method comprises:
    i. positioning the adsorbent such that the dynamic gas or vapor phase is in contact with the adsorbent at a contact time of less than 1 second; and
    ii. causing the concentration of the unwanted or target substance be reduced in the dynamic gas or vapor phase.

16. The method of claim 15, wherein in the coating there is about 0.01 to 80 wt % of the ferric hydroxide and 0.01 to 80 wt % of the incomplexed polyethylenimine based on the solids content of the coating.

17. The method of claim 15, wherein the nonwoven fabric comprises a web having a thickness of about 0.01 to 10 mm.

18. The method of claim 15, wherein the nonwoven fabric comprises a polyester non-woven.

19. The method of claim 15, wherein the nonwoven fabric comprises a polyolefin non-woven.

20. The adsorbent of claim 2, wherein the source of the iron(III) compound is a ferric sulfate, ferric chloride, ferric nitrate, or any combination thereof.

21. A container comprising the adsorbent of claim 1, wherein the container comprises the unwanted or target substances.

22. A face mask comprising one or more layers, wherein at least one of the one or more layers comprises the adsorbent of claim 1.

* * * * *